US012747163B2

(12) United States Patent
Nakada et al.

(10) Patent No.: US 12,747,163 B2
(45) **Date of Patent: *Sep. 29, 2026**

(54) NEGATIVE ELECTRODE MATERIAL, BATTERY, METHOD FOR PRODUCING NEGATIVE ELECTRODE MATERIAL, AND METHOD FOR PRODUCING BATTERY

(71) Applicant: MITSUBISHI MATERIALS CORPORATION, Tokyo (JP)

(72) Inventors: Yoshinobu Nakada, Saitama (JP); Naoki Rikita, Tokyo (JP); Jie Tang, Ibaraki (JP); Kun Zhang, Ibaraki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 18/695,861

(22) PCT Filed: Oct. 6, 2022

(86) PCT No.: PCT/JP2022/037519

§ 371 (c)(1),
(2) Date: Mar. 27, 2024

(87) PCT Pub. No.: WO2023/063228

PCT Pub. Date: Apr. 20, 2023

(65) Prior Publication Data

US 2025/0128959 A1 Apr. 24, 2025

(30) Foreign Application Priority Data

Oct. 13, 2021 (JP) ................................ 2021-168447

(51) Int. Cl.
*C01G 41/00* (2006.01)

(52) U.S. Cl.
CPC ........ *C01G 41/006* (2013.01); *C01P 2002/85* (2013.01); *C01P 2004/51* (2013.01); *C01P 2006/40* (2013.01)

(58) Field of Classification Search
None
See application file for complete search history.

(56) References Cited

U.S. PATENT DOCUMENTS 10,411,265 B2 9/2019 Takeda et al.
12,580,185 B2 * 3/2026 Nakada ................ H01M 4/133
(Continued)

FOREIGN PATENT DOCUMENTS

CN 101849306 A 9/2010
CN 103579594 A 2/2014
(Continued)

OTHER PUBLICATIONS

Supplementary European Search Report dated Sep. 9, 2025, issued for EP22880923.2.
(Continued)

*Primary Examiner* — Kevin M Bernatz
(74) *Attorney, Agent, or Firm* — Troutman Pepper Locke LLP

(57) ABSTRACT

Performance is improved. There is provided a negative electrode material for a battery, in which the negative electrode material includes carbon, sodium tungstate, and silicon particles 33 including silicon, and in the silicon particle 33, a ratio of the amount of Si in Si2p derived from elemental silicon to the amount of Si in Si2p derived from $SiO_2$ in a surface layer when measured by X-ray photoelectron spectroscopy is 3 or more on an atomic concentration basis.

11 Claims, 8 Drawing Sheets

(56) References Cited

U.S. PATENT DOCUMENTS

| | | | | |
|---|---|---|---|---|
| 2004/0058059 | A1* | 3/2004 | Linford | B82Y 40/00 427/58 |
| 2004/0241548 | A1 | 12/2004 | Nakamoto et al. | |
| 2005/0208379 | A1 | 9/2005 | Musha et al. | |
| 2006/0051675 | A1 | 3/2006 | Musha et al. | |
| 2006/0115735 | A1 | 6/2006 | Yasuda et al. | |
| 2008/0113269 | A1 | 5/2008 | Yamamoto et al. | |
| 2009/0162750 | A1 | 6/2009 | Kawakami et al. | |
| 2014/0038040 | A1 | 2/2014 | Park et al. | |
| 2016/0099463 | A1 | 4/2016 | Lee et al. | |
| 2017/0062871 | A1 | 3/2017 | Urata et al. | |
| 2018/0076462 | A1 | 3/2018 | Takeda et al. | |
| 2019/0115588 | A1 | 4/2019 | Matsuhara et al. | |
| 2020/0144606 | A1 | 5/2020 | Niina et al. | |
| 2021/0093579 | A1* | 4/2021 | Kobayashi | C05G 3/00 |
| 2022/0216478 | A1 | 7/2022 | Ito et al. | |
| 2024/0113289 | A1* | 4/2024 | Nakada | H01M 4/133 |
| 2024/0234701 | A1* | 7/2024 | Chung | H01M 4/483 |
| 2025/0128959 | A1 | 4/2025 | Nakada et al. | |

FOREIGN PATENT DOCUMENTS

| | | | |
|---|---|---|---|
| CN | 104103819 | A | 10/2014 |
| CN | 105489853 | A | 4/2016 |
| CN | 106063001 | A | 10/2016 |
| CN | 110402515 | A | 11/2019 |
| CN | 113206232 | A | 8/2021 |
| EP | 2204867 | A1 | 7/2010 |
| EP | 3002807 | A1 | 4/2016 |
| EP | 3734723 | A1 | 11/2020 |
| JP | 2004-319469 | A | 11/2004 |
| JP | 2005-63767 | A | 3/2005 |
| JP | 2009-164104 | A | 7/2009 |
| JP | 2014-32964 | A | 2/2014 |
| JP | 2015-125816 | A | 7/2015 |
| JP | 2016-076487 | A | 5/2016 |
| JP | 2018-045904 | A | 3/2018 |
| WO | 2006/075552 | A1 | 7/2006 |
| WO | 2015/129188 | A1 | 9/2015 |
| WO | 2021059974 | A1 | 4/2021 |
| WO | 2022/215498 | A1 | 10/2022 |
| WO | 2022/215501 | A1 | 10/2022 |

OTHER PUBLICATIONS

Office Action mailed May 13, 2025, issued for JP2021-168447 and English translation thereof.

Supplementary European Search Report dated Jun. 24, 2025, issued for EP22784483.4.

Ying Liu et al., "A novel propeller-like Si@WO3@C with boosted electrochemical properties as anode material for lithium-ion batteries", Vacuum, Pergamon Press, GB, vol. 184, Nov. 17, 2020, 109922, pp. 1-5.

Office Action dated Nov. 5, 2025, issued in the corresponding Taiwanese Patent Application No. 111112539 and English translation thereof.

Notice of Allowance dated Nov. 19, 2025, issued for U.S. Appl. No. 18/285,276.

Office Action Jan. 5, 2026, issued for Taiwanese Patent Application 111138653 and English translation thereof.

Office Action dated Jun. 25, 2026, issued in the related Chinese Patent Application No. 202280025583.6.

* cited by examiner

FIG.10

| | PRODUCTION CONDITION | | | CHARACTERISTICS OF SILICON MATERIAL DETERMINED FROM XPS MEASUREMENT | | | | | | | CHARACTERISTICS OF SILICON MATERIAL BASED ON VOLUME AVERAGE PARTICLE SIZE | | | | CHARACTERISTICS OF SILICON MATERIAL BASED ON D50 | | | | | |
|---|---|---|---|---|---|---|---|---|---|---|---|---|---|---|---|---|---|---|---|---|
| | SHAPE OF CONTAINER | PULVERIZATION TIME (h) | PULVERIZATION ATMOSPHERE | CONCENTRATION OF Si (at%) | CONCENTRATION OF O (at%) | CONCENTRATION RATIO Si/O | CONCENTRATION PROPORTION OF Si DERIVED FROM $SiO_2$ (%) | CONCENTRATION PROPORTION OF Si DERIVED FROM Si (%) | CONCENTRATION PROPORTION RATIO Si/Si ($SiO_2$) | OXIDE LAYER THICKNESS (Å) | VOLUME AVERAGE PARTICLE SIZE (μm) | $SiO_2$ VOLUME ($\mu m^3$) | PARTICLE VOLUME ($\mu m^3$) | $SiO_2$ VOLUME/PARTICLE VOLUME (%) | D50 (μm) | $SiO_2$ VOLUME ($\mu m^3$) | PARTICLE VOLUME ($\mu m^3$) | $SiO_2$ VOLUME/PARTICLE VOLUME (%) | D90 (μm) | SPECIFIC SURFACE AREA ($m^2/g$) |
| EXAMPLE 1 | 80mm φ $ZrO_2$ SPHERICAL CONTAINER | 6 | Ar | 53.78 | 42.73 | 1.26 | 17.93 | 82.07 | 3.60 | 1.67 | 1.92 | 0.00193 | 3.70 | 0.052 | 0.31 | 5.02E-05 | 0.0156 | 0.32 | 6.95 | 7.21 |
| EXAMPLE 2 | 80mm φ $ZrO_2$ SPHERICAL CONTAINER | 3 | Ar | 55.14 | 40.01 | 1.38 | 21.74 | 78.26 | 4.58 | 1.31 | 2.50 | 0.00257 | 8.18 | 0.031 | 0.34 | 4.75E-05 | 0.0206 | 0.23 | 7.34 | 6.22 |
| EXAMPLE 3 | 80mm φ $ZrO_2$ SPHERICAL CONTAINER | 4 | Ar | 54.52 | 41.09 | 1.33 | 20.03 | 79.97 | 3.60 | 1.67 | 2.36 | 0.00291 | 6.88 | 0.042 | 0.33 | 5.69E-05 | 0.0188 | 0.30 | 7.23 | 6.58 |
| EXAMPLE 4 | 80mm φ SUS LONG BODY CONTAINER | 2 | Ar | 56.39 | 40.05 | 1.41 | 19.64 | 80.36 | 3.99 | 1.50 | 2.08 | 0.00204 | 4.71 | 0.043 | 0.30 | 4.24E-05 | 0.0141 | 0.30 | 6.24 | 6.31 |
| EXAMPLE 5 | 80mm φ SUS LONG BODY CONTAINER | 1 | Ar | 58.92 | 36.37 | 1.62 | 15.92 | 84.08 | 5.28 | 1.14 | 2.30 | 0.00189 | 6.37 | 0.030 | 0.33 | 3.88E-05 | 0.0188 | 0.21 | 6.51 | 5.97 |
| EXAMPLE 6 | 80mm φ SUS LONG BODY CONTAINER | 3 | Ar | 51.77 | 45.02 | 1.15 | 23.64 | 76.36 | 3.23 | 1.86 | 1.88 | 0.00206 | 3.48 | 0.059 | 0.29 | 4.90E-05 | 0.0128 | 0.38 | 6.04 | 7.06 |
| EXAMPLE 7 | 80mm φ $ZrO_2$ SPHERICAL CONTAINER | 2 | Ar | 56.03 | 39.68 | 1.41 | 23.64 | 76.36 | 3.23 | 1.86 | 3.01 | 0.00528 | 14.27 | 0.037 | 0.39 | 8.86E-05 | 0.0310 | 0.29 | 8.59 | 5.88 |
| COMPARATIVE EXAMPLE 1 | - | - | - | - | - | - | - | - | - | - | - | - | - | - | - | - | - | - | - | - |
| COMPARATIVE EXAMPLE 2 | 80mm φ SUS LONG BODY CONTAINER | 1 | AIR | 47.98 | 49.10 | 0.98 | 28.57 | 71.43 | 2.50 | 2.40 | 2.17 | 0.00355 | 5.35 | 0.066 | 0.31 | 7.23E-05 | 0.0156 | 0.46 | 7.03 | 6.48 |
| COMPARATIVE EXAMPLE 3 | 80mm φ $ZrO_2$ SPHERICAL CONTAINER | 3 | AIR | 46.71 | 50.43 | 0.93 | 29.63 | 70.37 | 2.37 | 2.53 | 2.48 | 0.00488 | 7.98 | 0.061 | 0.33 | 8.63E-05 | 0.0188 | 0.46 | 7.54 | 6.19 |

FIG.11

| | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 | COMPARATIVE EXAMPLE 3 |
|---|---|---|---|---|---|---|---|---|---|---|
| COMPOSITION | HC-NaxWOy-Si | HC-NaxWOy-Si | HC-NaxWOy-Si | HC-NaxWOy-Si | HC-NaxWOy-Si | HC-NaxWOy-Si | HC-NaxWOy-Si | HC | HC-NaxWOy-Si | HC-NaxWOy-Si |
| CONTENT OF C (MASS%) | 83.6 | 91.7 | 75.7 | 79.4 | 86.4 | 79.7 | 89.1 | 99.7 | 70.7 | 64.6 |
| CONTENT OF O (MASS%) | 9.94 | 2.89 | 6.46 | 9.48 | 5.20 | 10.3 | 4.58 | 0.189 | 16.6 | 18.5 |
| CONTENT OF Si (MASS%) | 3.75 | 3.19 | 3.59 | 3.62 | 6.58 | 8.76 | 2.69 | 0.039 | 8.54 | 8.96 |
| CONTENT OF W (MASS%) | 2.45 | 1.12 | 14 | 7.17 | 1.57 | 1.08 | 2.99 | 0 | 3.05 | 6.74 |
| CONTENT OF Na (MASS%) | 0.103 | 0.0395 | 0.131 | 0.164 | 0.071 | 0.074 | 0.439 | 0 | 0.087 | 0.014 |
| CONTENT OF S (MASS%) | 0.093 | 0.039 | 0.038 | 0.041 | 0.056 | 0.046 | 0.123 | 0.013 | 0.053 | 0.044 |
| Na/W | 0.042 | 0.035 | 0.009 | 0.023 | 0.045 | 0.068 | 0.147 | | 0.029 | 0.002 |
| Si/C | 0.045 | 0.035 | 0.047 | 0.046 | 0.076 | 0.110 | 0.030 | 0.000 | 0.121 | 0.139 |
| W/C | 0.029 | 0.012 | 0.185 | 0.090 | 0.018 | 0.014 | 0.034 | 0.000 | 0.043 | 0.104 |
| Si/W | 1.531 | 2.848 | 0.256 | 0.505 | 4.191 | 8.111 | 0.900 | | 2.800 | 1.329 |
| Si/O | 0.377 | 1.104 | 0.556 | 0.382 | 1.265 | 0.850 | 0.587 | 0.206 | 0.514 | 0.484 |
| NaxWOy CHEMICAL FORMULA (CRYSTAL SYSTEM): FOM | $Na_{0.78}WO_3$ (CUBIC CRYSTAL): 0.208 | $Na_{0.72}WO_3$ (CUBIC CRYSTAL): 0.611 | $Na_{0.44}WO_3$ (CUBIC CRYSTAL): 0.243 | $Na_{0.49}WO_3$ (CUBIC CRYSTAL): 0.171 | $Na_{0.48}WO_3$ (TETRAGONAL CRYSTAL): 0.972 | $Na_{0.48}WO_3$ (TETRAGONAL CRYSTAL): 0.678 | $Na_2WO_4$ (CUBIC CRYSTAL): 0.517 | | $Na_{0.48}WO_3$ (TETRAGONAL CRYSTAL): 0.563 | |
| NaxWOy CHEMICAL FORMULA (CRYSTAL SYSTEM): FOM | $Na_{0.48}WO_3$ (TETRAGONAL CRYSTAL): 1.014 | $Na_{0.48}WO_3$ (TETRAGONAL CRYSTAL): 1.390 | $Na_5(W_{14}O_{44})$ (TRICLINIC CRYSTAL): 0.925 | $Na_{0.33}WO_3$ (TETRAGONAL CRYSTAL): 1.01 | | | | | | |
| BATTERY CHARACTERISTICS (CV CHARACTERISTICS) Li ABSORPTION AND EMISSION PEAK IN Si | PRESENT | PRESENT | PRESENT | PRESENT | PRESENT | PRESENT | PRESENT | ABSENT | ABSENT | ABSENT |
| BATTERY CHARACTERISTICS (RATE CHARACTERISTICS AT 0.2C) mAh/g | 218 | 223 | 201 | 208 | 226 | 203 | 217 | 160 | 201 | 194 |
| BATTERY CHARACTERISTICS (RATE CHARACTERISTICS AT 3.2C) mAh/g | 105 | 119 | 110 | 107 | 126 | 104 | 117 | 103 | 92 | 87 |

NEGATIVE ELECTRODE MATERIAL, BATTERY, METHOD FOR PRODUCING NEGATIVE ELECTRODE MATERIAL, AND METHOD FOR PRODUCING BATTERY

FIELD

The present invention relates to a negative electrode material, a battery, a method for producing a negative electrode material, and a method for producing a battery.

BACKGROUND

As a negative electrode material of a lithium ion secondary battery, carbon may be used. For example, Patent Literature 1 describes a negative electrode in which tungsten trioxide is disposed on a surface of graphite. By disposing tungsten trioxide on the surface of the graphite, diffusivity of lithium ions can be improved, and the performance of the battery can be improved. In addition, for example, Patent Literature 2 describes a negative electrode containing silicon particles (silicon), tungsten, and carbon.

CITATION LIST

Patent Literature

Patent Literature 1: JP 2018-45904 A
Patent Literature 2: JP 2015-125816 A

SUMMARY

Technical Problem

In a negative electrode material, performance can be improved by providing a tungsten compound such as tungsten trioxide or silicon, but there is room for improvement in performance.

The present invention has been made in view of the above, and an object of the present invention is to provide a negative electrode material having improved performance, a battery, a method for producing a negative electrode material, and a method for producing a battery.

Solution to Problem

To solve the problem described above and achieve the object, a negative electrode material according to the present disclosure is for a battery and includes carbon, sodium tungstate, and a silicon material including silicon. In the silicon material, a ratio of an amount of Si in Si2p derived from elemental silicon to an amount of Si in Si2p derived from $SiO_2$ in a surface layer is 3 or more, on an atomic concentration basis, as measured by X-ray photoelectron spectroscopy.

To solve the problem described above and achieve the object, a battery according to the present disclosure includes: the above-described negative electrode material; and a positive electrode material.

To solve the problem described above and achieve the object, a method according to the present disclosure is for producing a negative electrode material for a battery and includes the steps of: preparing a silicon raw material under an atmosphere having an oxygen concentration of 5% or less; and producing the negative electrode material including carbon, sodium tungstate, and a silicon material by using the silicon raw material. In the silicon material, a ratio of an amount of Si in Si2p derived from elemental silicon to an amount of Si in Si2p derived from $SiO_2$ in a surface layer is 3 or more, on an atomic concentration basis, as measured by X-ray photoelectron spectroscopy.

To solve the problem described above and achieve the object, a method according to the present disclosure is for producing a battery and includes: the above-described method for producing a negative electrode material; and a step of producing a positive electrode material.

Advantageous Effects of Invention

According to the present invention, the performance of the negative electrode material can be improved.

BRIEF DESCRIPTION OF DRAWINGS

FIG. 10 is a table showing production conditions and characteristics of a silicon material in each example.

FIG. 11 is a table showing identification results of negative electrode materials and battery characteristic results in each example.

DESCRIPTION OF EMBODIMENTS

Hereinafter, the present invention will be described in detail with reference to the drawings. Note that the present invention is not limited by the mode for carrying out the following invention (hereinafter, referred to as an embodiment). In addition, constituent elements in the following embodiments include those that can be easily assumed by those skilled in the art or those that are substantially the same. Furthermore, the constituent elements disclosed in the following embodiments can be appropriately combined.

Battery

Figure 1:
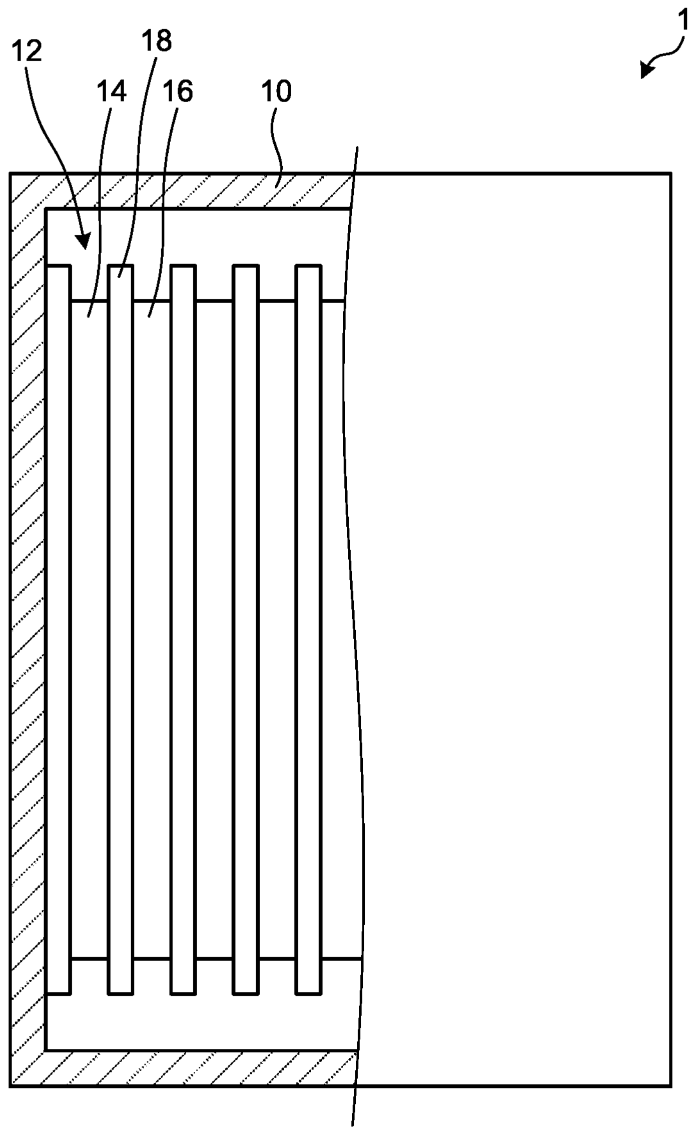
FIG. 1 is a schematic partial cross-sectional view of a battery according to the present embodiment.

FIG. 1 is a schematic partial cross-sectional view of a battery according to the present embodiment. A battery 1 according to the present embodiment is a lithium ion secondary battery. The battery 1 includes a casing 10, an electrode group 12, and an electrolyte (not illustrated). The casing 10 is a case for storing the electrode group 12 and the electrolyte therein. In addition to the electrode group 12, the casing 10 may include wiring, terminals, and the like connected to the electrode group 12.

The electrode group 12 includes a negative electrode 14, a positive electrode 16, and a separator 18. The electrode group 12 has a configuration in which the separator 18 is disposed between the negative electrode 14 and the positive electrode 16. In the example of FIG. 1, the electrode group 12 has a so-called stacked electrode group structure in which a rectangular negative electrode 14 and a rectangular positive electrode 16 are alternately stacked with a rectangular separator 18 interposed therebetween. However, the electrode group 12 is not limited to the stacked electrode group structure. For example, the electrode group 12 may have a wound electrode group structure in which a strip-shaped negative electrode 14 and a strip-shaped positive electrode 16 are stacked with a strip-shaped separator 18 interposed therebetween and wound.

Negative Electrode

Figure 2:
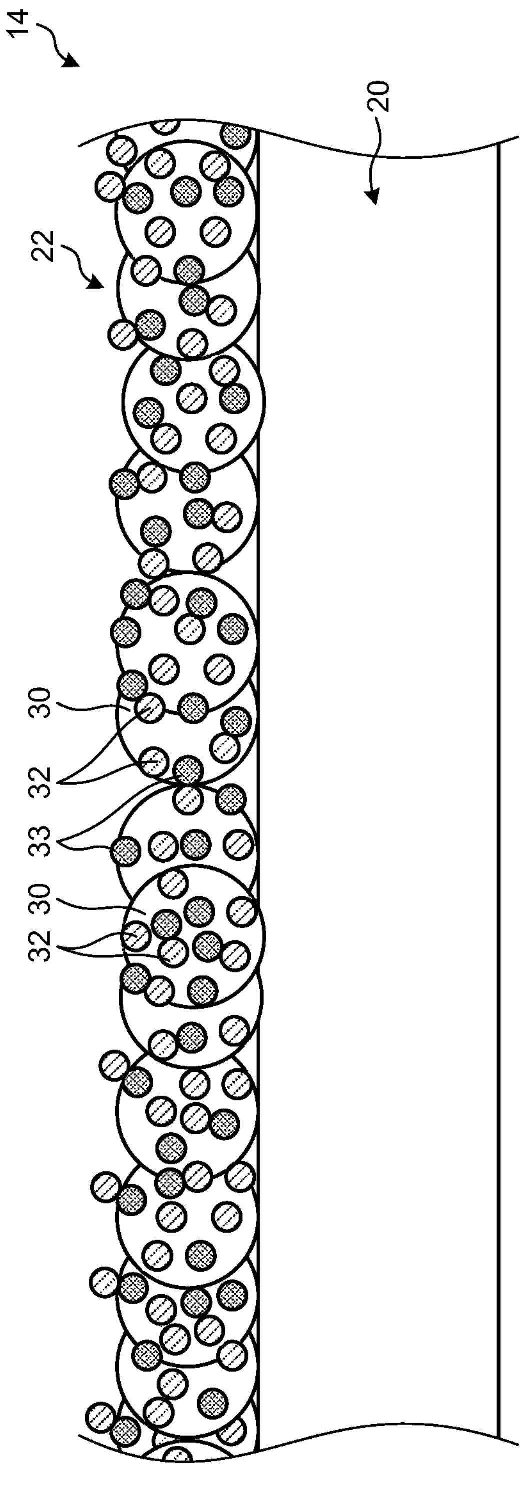
FIG. 2 is a schematic cross-sectional view of an example of a negative electrode according to the present embodiment.

FIG. 2 is a schematic cross-sectional view of an example of a negative electrode according to the present embodiment. As illustrated in FIG. 2, the negative electrode 14 includes a current collecting layer 20 and a negative electrode material layer 22. The current collecting layer 20 is a layer formed of a conductive member. Examples of the conductive member of the current collecting layer 20 include copper. The negative electrode material layer 22 is a layer containing the negative electrode material according to the present embodiment. The negative electrode material layer 22 is provided on a surface of the current collecting layer 20. A thickness of the current collecting layer 20 may be, for example, about 15 μm or more and 40 μm or less, and a thickness of the negative electrode material layer 22 may be, for example, about 20 μm or more and 200 μm or less. Note that the negative electrode 14 may include the negative electrode material layers 22 formed on both surfaces of the current collecting layer 20.

The negative electrode material layer 22 contains a negative electrode material. The negative electrode material includes carbon, sodium tungstate, and a silicon material (silicon particles). The sodium tungstate is a tungsten compound represented by $Na_xWO_y$, and x and y are numbers larger than 0. Details of $Na_xWO_y$ will be described below. In the negative electrode material of the present embodiment, sodium tungstate is provided on a surface of carbon, and a silicon material is provided on a surface of carbon, but a positional relationship between the carbon, the sodium tungstate, and the silicon material is not limited thereto, and may be arbitrary. More specifically, the negative electrode material of the negative electrode material layer 22 includes carbon particles 30 which are particles of carbon, $Na_xWO_y$ (sodium tungstate) particles 32 which are particles of sodium tungstate, and silicon particles 33 which are particles including silicon. Note that the shape of the particle here is not limited to a spherical shape or the like, and may be any shape such as a linear shape or a sheet shape. Furthermore, the shape of the particle surface may be smooth or uneven.

The sodium tungstate provided on the surface of the carbon includes at least one of sodium tungstate obtained by directly fixing sodium tungstate to carbon, sodium tungstate obtained by indirectly fixing sodium tungstate to carbon via silicon fixed to carbon, sodium tungstate obtained by indirectly fixing silicon to carbon via sodium tungstate fixed to carbon, and sodium tungstate obtained by directly or indirectly fixing composite particles in which sodium tungstate and silicon are directly fixed to carbon. Note that the negative electrode material in the present embodiment preferably includes at least carbon and a silicon material to which sodium tungstate is fixed. In addition, the negative electrode material of the present embodiment may be formed of carbon, sodium tungstate, and a silicon material, and may not include any material other than carbon, sodium tungstate, and a silicon material, except for inevitable impurities. In addition, the negative electrode material of the present embodiment may include inevitable impurities in the balance.

The negative electrode material of the negative electrode material layer 22 includes a plurality of carbon particles 30. The carbon particles 30 contain amorphous carbon or graphite.

The amorphous carbon is amorphous carbon having no crystal structure. Amorphous carbon is sometimes called amorphous carbon or diamond-like carbon, and can be said to be carbon in which sp2 bonds and sp3 bonds are mixed. The carbon particles of amorphous carbon are composed of amorphous carbon as a whole, and preferably contain no components other than amorphous carbon except for inevitable impurities. Specifically, it is preferable that the carbon particles of amorphous carbon do not contain graphite.

In addition, since the amorphous carbon can contain a functional group (for example, a hydroxy group and a carboxyl group) on the surface, sodium tungstate can be disposed on the surface of the amorphous carbon. Therefore, sodium tungstate can be appropriately trapped on the surface of the amorphous carbon by the functional group, and sodium tungstate can be appropriately attached and disposed on the surface. In addition, since sodium tungstate is fixed to the surface of the amorphous carbon by the functional group, adhesion of the sodium tungstate to the surface of the amorphous carbon can be increased, and separation of the sodium tungstate from the surface of the carbon can be suppressed. In particular, since a hard carbon raw material is produced at a temperature lower than that of, for example, graphite, it is easy to remain without removing the functional group, and sodium tungstate and silicon can be appropriately sticked and disposed on the surface.

Graphite is carbon having a planar crystal structure.

An average particle size of the carbon particles 30 is preferably 1 μm or more and 50 μm or less, and more preferably 1 μm or more and 20 μm or less. When the average particle size is within this range, the strength of the electrode film can be maintained.

The negative electrode material of the negative electrode material layer 22 further includes a plurality of $Na_xWO_y$ particles 32 and silicon particles (silicon material) 33. More specifically, a plurality of $Na_xWO_y$ particles 32 and silicon particles 33 are provided for each carbon particle 30. One $Na_xWO_y$ particle 32 of the plurality of $Na_xWO_y$ particles 32 is provided on the surface of the carbon particle 30. In addition, the other $Na_xWO_y$ particles 32 of the plurality of $Na_xWO_y$ particles 32 are provided on the surface of the silicon particles 33. More specifically, the silicon particles 33 are in adhesion (contact) with the surface of the carbon particle 30, and the $Na_xWO_y$ particles 32 are in adhesion (contact) with the surface of the silicon particle 33. The carbon particles 30, the $Na_xWO_y$ particles 32, and the silicon particles 33 may be made into a composite. Alternatively, the carbon particles 30 and the silicon particles 33 may be made into a composite, and the carbon particles 30 and the $Na_xWO_y$ particles 32 may be made into a composite. Therefore, the negative electrode material of the negative electrode material layer 22 has a configuration in which the carbon particles 30, the $Na_xWO_y$ particles 32, and the silicon particles 33 are made into a composite, and may further include at least one of a configuration in which the carbon particles 30 and the silicon particles 33 are made into a composite and a configuration in which the carbon particles 30 and the $Na_xWO_y$ particles 32 are made into a composite.

Furthermore, sodium tungstate may take not only a form of $Na_xWO_y$ but also a form such as $Na_2WO_4$ or $Na_5W_{14}O_{44}$ in terms of a crystal structure. Note that $Na_2WO_4$ is represented by the chemical formula of $Na_xWO_y$ since the molar ratio of Na is 2, the molar ratio of W is 1, and the molar ratio of O is 4. In addition, since $Na_5W_{14}O_{44}$ is represented by the chemical formula of $Na_{5/14}WO_{44/14}$ (that is, the molar ratio of Na is 5/14, the molar ratio of W is 1, and the molar ratio of O is 44/14) when the molar ratio of W is converted to 1, it can be said that it is represented by the chemical formula of $Na_xWO_y$. That is, it can be said that sodium tungstate represented by the chemical formula of $Na_xWO_y$ refers to sodium tungstate in which a ratio of the molar ratio of Na, the molar ratio of W, and the molar ratio of O is X:1:Y.

Here, the making into a composite refers to a state in which it is impossible to separate the silicon particles 33 from the carbon particles 30, separate the silicon particles 33 from the $Na_xWO_y$ particles 32, and separate the $Na_xWO_y$ particles 32 from the carbon particles 30 at least in a case where an external force does not act. For example, the external force refers to a force when a solid electrolyte interphase (SEI) film is formed to cover the entire surface layer and is expanded and contracted when a battery using a negative electrode material is operated.

For example, the making into a composite includes at least one of formation of a composite in which the silicon particles 33 are disposed on the surface of the carbon particle 30 and the $Na_xWO_y$ particles 32 are disposed on the surface of the silicon particle 33, formation of a composite in which the $Na_xWO_y$ particles 32 are disposed on the surface of the carbon particle 30 and the silicon particles 33 are disposed on the surface of the $Na_xWO_y$ particle 32, formation of a composite in which the silicon particles 33 are disposed on the surface of the carbon particle 30, formation of a composite in which the $Na_xWO_y$ particles 32 are disposed on the surface of the carbon particle 30, formation a composite in which the $Na_xWO_y$ particles 32 are disposed on the surface of the silicon particle 33, and disposition of the $Na_xWO_y$ particles 32 and the silicon particles 33 on the surface of the carbon particle 30 and adhesion (contact) between the $Na_xWO_y$ particles 32 and the silicon particles 33.

The $Na_xWO_y$ particles 32 included in the negative electrode material of the negative electrode material layer 22 preferably have y (molar ratio of O) of 3, in other words, preferably $Na_xWO_3$. In addition, in the $Na_xWO_y$ particles 32 included in the negative electrode material of the negative electrode material layer 22, x (molar ratio of Na) is preferably more than 0 and 1 or less, and y (molar ratio of O) is preferably 2 or more and 4 or less. In addition, in the $Na_xWO_y$ particles 32, it is more preferable that the molar ratio of x is 0.1 or more and 0.95 or less and y is 2.5 or more and 3.5 or less, and it is still more preferable that the molar ratio of x is 0.3 or more and 0.7 or less and y is 2.8 or more and 3.2 or less. When x and y are in these ranges, the $Na_xWO_y$ particles 32 can be appropriately disposed on the surface of the carbon particle 30. Note that the negative electrode material of the negative electrode material layer 22 may include only one type of $Na_xWO_y$ particles 32 or may include a plurality of types of $Na_xWO_y$ particles 32.

In addition, the negative electrode material of the negative electrode material layer 22 preferably includes at least one of $Na_{0.78}WO_3$, $Na_{0.48}WO_3$, $Na_{0.72}WO_3$, $Na_{0.44}WO_3$, $Na_{0.49}WO_3$, $Na_{0.33}WO_3$, $Na_2WO_4$, and $Na_5W_{14}O_{44}$ as the $Na_xWO_y$ particles 32.

In addition, at least one of $Na_2WO_4$ and $Na_5W_{14}O_{44}$ may be included. As described above, the negative electrode material of the negative electrode material layer 22 in the present embodiment preferably includes at least one of $Na_{0.78}WO_3$, $Na_{0.48}WO_3$, $Na_{0.72}WO_3$, $Na_{0.44}WO_3$, $Na_{0.49}WO_3$, $Na_{0.33}WO_3$, $Na_{0.58}WO_3$, $Na_2WO_4$, and $Na_5W_{14}O_{44}$ as the sodium tungstate.

The compound included in the negative electrode material such as the $Na_xWO_y$ particles 32 can be measured by X-ray diffraction (XRD). The measurement conditions in XRD may be, for example, as follows.

Measuring apparatus: Ultima IV manufactured by Rigaku Corporation
Used tube: Cu
Tube voltage: 40 kV
Tube current: 40 mA
Scanning range: 5° to 80°
Scanning speed: 2°/min As a database for identifying the compound, ICDD (PDF2.DAT), that is, PDF2.DAT of International Centre for Diffraction Data (ICDD) in the powder diffraction/crystal structure database may be used. Then, for a crystal peak detected by XRD, the compound included in the measurement sample (here, the negative electrode material) may be specified using PDXL2 which is integrated powder X-ray diffraction software. Specifically, a compound having a figure of merit (FOM) of a threshold or less may be extracted using the same software, and the compound having the FOM of the threshold or less may be specified as a compound included in the measurement sample (here, the negative electrode material). The FOM takes a value of 0 to 100, and the smaller the value, the higher the matching degree. The threshold of the FOM may be 10. That is, for example, when the FOM of the diffraction peak of the negative electrode material with respect to the diffraction peak of $Na_{0.3}WO_3$ in ICDD is a threshold (for example, 10) or less, it is determined that $Na_{0.3}WO_3$ is included in the negative electrode material. For example, when a peak waveform in an X-ray diffraction analysis result of an analyte shows the peak waveform of carbon, the position of the peak waveform identifies it as; for example, a (002) graphite structure. However, if the peak waveform does not appear and is broad, it can be determined that the material is amorphous carbon.

The $Na_xWO_y$ particles 32 preferably include at least one of particles having a cubic crystal structure, particles having a tetragonal crystal structure, and particles having a triclinic crystal structure. That is, the negative electrode material may have only a cubic crystal structure, may have only a tetragonal crystal structure, may have only a triclinic crystal structure, may have both a cubic crystal structure and a tetragonal crystal structure, may have both a cubic crystal structure and a triclinic crystal structure, may have both a tetragonal crystal structure and a triclinic crystal structure, or may have all of a cubic crystal structure, a tetragonal crystal structure, and a triclinic crystal structure, as the $Na_xWO_y$ particles 32. In a case where both the cubic crystal structure and the tetragonal crystal structure are included as the $Na_xWO_y$ particles 32, the negative electrode material of the negative electrode material layer 22 may include more tetragonal $Na_xWO_y$ particles 32 than the cubic $Na_xWO_y$ particles 32. In addition, in a case where a triclinic crystal structure and another crystal structure are included, a content of the triclinic crystal structure may be smaller than that of the other crystal structure.

Examples of cubic $Na_xWO_y$ include $Na_{0.3}WO_3$, $Na_{0.78}WO_3$, $Na_{0.72}WO_3$, $Na_{0.44}WO_3$, $Na_{0.49}WO_3$, $Na_{0.58}WO_3$, and $Na_2WO_4$, examples of tetragonal $Na_xWO_y$ include $Na_{0.1}WO_3$, $Na_{0.48}WO_3$, and $Na_{0.33}WO_3$, and examples of triclinic $Na_xWO_y$ include $Na_5W_{14}O_{44}$. However, the crystal structure of sodium tungstate included in the negative electrode material is not limited thereto, and for example, sodium tungstate having another crystal structure may be included. In addition, the negative electrode material may include amorphous sodium tungstate.

Note that the crystal structure of the $Na_xWO_y$ particles 32 can also be identified by the same method as the identification of the compound included in the negative electrode material. That is, for example, in a case where the FOM of the diffraction peak of the negative electrode material and an FOM of a diffraction peak with respect to cubic $Na_{0.3}WO_3$ in ICDD are thresholds (for example, 10) or less, it is determined that cubic $Na_{0.3}WO_3$ is included in the negative electrode material.

An average particle size of the $Na_xWO_y$ particles 32 is preferably smaller than the average particle size of the carbon particles 30. The average particle size of the $Na_xWO_y$ particles 32 is preferably 100 nm or more and 20 μm or less, and more preferably 100 nm or more and 1 μm or less.

As described above, the negative electrode material has a structure in which the particulate sodium tungstate ($Na_xWO_y$ particles 32) and the silicon material (silicon particles 33) are provided on the surface of the carbon particle 30, but is not limited thereto. The negative electrode material may have a structure in which sodium tungstate and a silicon material are provided on a surface of carbon, and the shape of each of the sodium tungstate and the silicon material provided on the surface of the carbon may be arbitrary. In the present embodiment, as the silicon particles 33, silicon fine particles are used, and silicon compound fine particles may be used.

A content of the sodium tungstate ($Na_xWO_y$ particles 32) in the negative electrode material can be confirmed by measuring contents of Na, W, and O by fluorescent X-ray analysis. That is, since at least a part of the total amount of Na, W, and O detected by fluorescent X-ray analysis constitutes the sodium tungstate ($Na_xWO_y$ particles 32), the content of the sodium tungstate can be confirmed by the contents of Na, W, and O.

The negative electrode material preferably has a content of Na of 0.01% or more and 0.5% or less in terms of a mass ratio, a content of W of 0.5% or more and 20% or less in terms of a mass ratio, and a content of O of 1% or more and 15% or less in terms of a mass ratio when measured by fluorescent X-ray analysis. In addition, the negative electrode material more preferably has the content of Na of 0.02% or more and 0.4% or less in terms of a mass ratio, the content of W of 0.7% or more and 17% or less in terms of a mass ratio, and the content of O of 2% or more and 13% or less in terms of a mass ratio when measured by fluorescent X-ray analysis. In addition, the negative electrode material still more preferably has the content of Na of 0.03% or more and 0.3% or less in terms of a mass ratio, the content of W of 1% or more and 15% or less in terms of a mass ratio, and the content of O of 3% or more and 12% or less in terms of a mass ratio when measured by fluorescent X-ray analysis. When the contents of Na, W, and O are in these ranges, an appropriate amount of sodium tungstate is contained, and a tungsten compound can be appropriately disposed on the surface of the carbon.

When the negative electrode material is measured by fluorescent X-ray analysis, the content of C is preferably 60% or more and 95% or less, more preferably 65% or more and 95% or less, and still more preferably 70% or more and 92% or less in terms of a mass ratio. When the content of C is in this range, the tungsten compound can be appropriately disposed on the surface of the carbon.

When the negative electrode material is measured by fluorescent X-ray analysis, Na/W which is a ratio of the content of Na to the content of W is preferably 0.001 or more and 0.2 or less, more preferably 0.005 or more and 0.15 or less, and still more preferably 0.007 or more and 0.15 or less in terms of a mass ratio. In addition, when the negative electrode material is measured by fluorescent X-ray analysis, W/C which is a ratio of the content of W to the content of C is preferably 0.005 or more and 0.3 or less, more preferably 0.008 or more and 0.25 or less, and still more preferably 0.01 or more and 0.2 or less in terms of a mass ratio. When the ratios of the contents are in these ranges, the tungsten compound can be appropriately disposed on the surface of the carbon.

A content of the silicon particles 33 in the negative electrode material can be confirmed by measuring a content of Si by fluorescent X-ray analysis. That is, at least a part of the total amount of Si detected by fluorescent X-ray analysis constitutes the silicon particles 33.

When the negative electrode material is measured by fluorescent X-ray analysis, the content of Si is preferably 1% or more and 15% or less, more preferably 2% or more and 12% or less, and still more preferably 3% or more and 10% or less in terms of a mass ratio. When the content of Si is in this range, the silicon particles 33 can be appropriately disposed on the surface of the carbon.

When the negative electrode material is measured by fluorescent X-ray analysis, Si/C which is a ratio of the content of Si to the content of C is preferably 0.01 or more and 0.3 or less, more preferably 0.02 or more and 0.25 or less, and still more preferably 0.03 or more and 0.15 or less in terms of a mass ratio. In addition, when the negative electrode material is measured by fluorescent X-ray analysis, Si/W which is a ratio of the content of Si to the content of W is preferably 0.1 or more and 15 or less, more preferably 0.15 or more and 12 or less, and still more preferably 0.2 or more and 10 or less in terms of a mass ratio. In addition, when the negative electrode material is measured by fluorescent X-ray analysis, Si/O which is a ratio of the content of Si to the content of O is preferably 0.1 or more and 2 or less, more preferably 0.2 or more and 1.5 or less, and still more preferably 0.3 or more and 1.3 or less in terms of a mass ratio. When the ratios of the contents are in these ranges, the tungsten compound can be appropriately disposed on the surface of the carbon.

The fluorescent X-ray analysis may be performed using a wavelength dispersive fluorescent X-ray analyzer, and the measurement conditions may be as follows.

Measuring apparatus: ZSX PrimusIV manufactured by Rigaku Corporation

Tube voltage: 30 kV

Tube current: 100 mA

As a measurement method, a standardless fundamental parameter method may be used, and for analysis, the SQX scattered radiation FP method from Rigaku Corporation may be used.

Note that the negative electrode material layer 22 may contain a substance other than the negative electrode material (carbon particles 30, $Na_xWO_y$ particles 32, and silicon particles 33). The negative electrode material layer 22 may contain, for example, a binder. A material of the binder may be any material, and examples thereof include polyvinylidene fluoride (PVDF), carboxymethyl cellulose (CMC), styrene butadiene rubber (SBR), and polyacrylic acid (PAA). The binders may be used alone or in combination of two or more. However, in a case where the carbon particles 30 are amorphous carbon, it is preferable that the negative electrode material layer 22, in other words, the negative electrode material does not include graphite.

In addition, the disposition of the $Na_xWO_y$ particles 32 and the silicon particles 33 on the surface of the carbon particle 30 can be confirmed by observation with an electron microscope such as a scanning electron microscope (SEM) or a transmission electron microscope (TEM).

In addition, in the negative electrode material of the negative electrode material layer 22, the silicon particles 33 may be in adhesion (contact) with the surface of the carbon particle 30, and the $Na_xWO_y$ particles 32 may be in adhesion (contact) with the surface of the carbon particle 30. In this case, the carbon particles 30 and the silicon particles 33 may be made into a composite, and the carbon particles 30 and the $Na_xWO_y$ particles 32 may be made into a composite.

As described above, the negative electrode material has a structure in which the particulate sodium tungstate ($Na_xWO_y$ particles 32) and the silicon particles 33 are provided on the surface of the carbon particle 30, but is not limited thereto. The negative electrode material may have a structure in which sodium tungstate and a silicon material are provided on a surface of carbon, and the shape of each of the sodium tungstate and the silicon material provided on the surface of the carbon may be arbitrary.

Silicon Material

Figure 3:
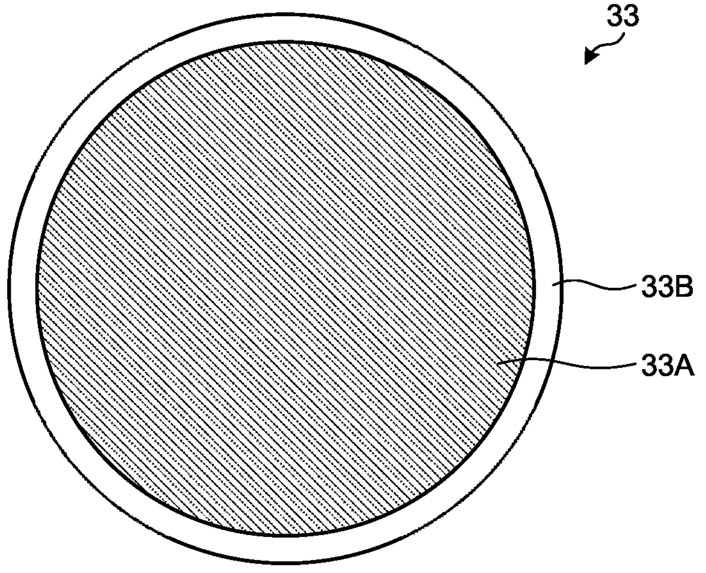
FIG. 3 is a schematic cross-sectional view of a silicon material.

FIG. 3 is a schematic cross-sectional view of a silicon material before addition. As illustrated in FIG. 3, the silicon particle 33 includes a Si layer 33A and an oxide layer 33B. The Si layer 33A is a layer formed of Si, and can be said to be a portion to be a core of the silicon particle 33. The Si layer 33A preferably contains no element other than Si except for inevitable impurities. The oxide layer 33B is a layer formed on a surface of the Si layer 33A, and preferably covers the entire surface of the Si layer 33A. The oxide layer 33B can be said to be a layer that becomes the outermost surface of the silicon particle 33 The oxide layer 33B is a layer formed of oxide of silicon ($SiO_x$). The oxide layer 33B contains $SiO_2$ as silicon oxide, and may contain silicon oxide other than $SiO_2$, for example, SiO. The oxide layer 33B preferably does not contain elements other than the elements constituting the oxide of silicon except for inevitable impurities.

Characteristics of Silicon Material Based on XPS

Next, characteristics of the silicon particles 33 when measured using X-ray photoelectron spectroscopy (XPS) will be described. Hereinafter, unless otherwise specified, the measurement conditions of the X-ray photoelectron spectroscopy are as follows.

- Measuring apparatus: PHI5000 Versa ProbeII (manufactured by ULVAC-PHI, Incorporated)
- Excited X-ray: monochrome AlKα ray
- Output: 50 W
- Path energy: 187.85 eV (Survey), 46.95 eV (Narrow)
- Measurement interval: 0.8 eV/step (Survey), 0.1 eV/step (Narrow).
- Photoelectron extraction angle with respect to sample surface: 45°
- X-ray diameter: 200 μm Ratio of Amount of Si Derived from Elemental Silicon to Amount of Si Derived from $SiO_2$ In the silicon particle 33, a ratio of the amount of Si in Si2p derived from elemental silicon to the amount of Si in Si2p derived from $SiO_2$ in the surface layer when measured by X-ray photoelectron spectroscopy is 3.0 or more, preferably 3.5 or more, and more preferably 4 or more on an atomic concentration basis.

Figure 5:
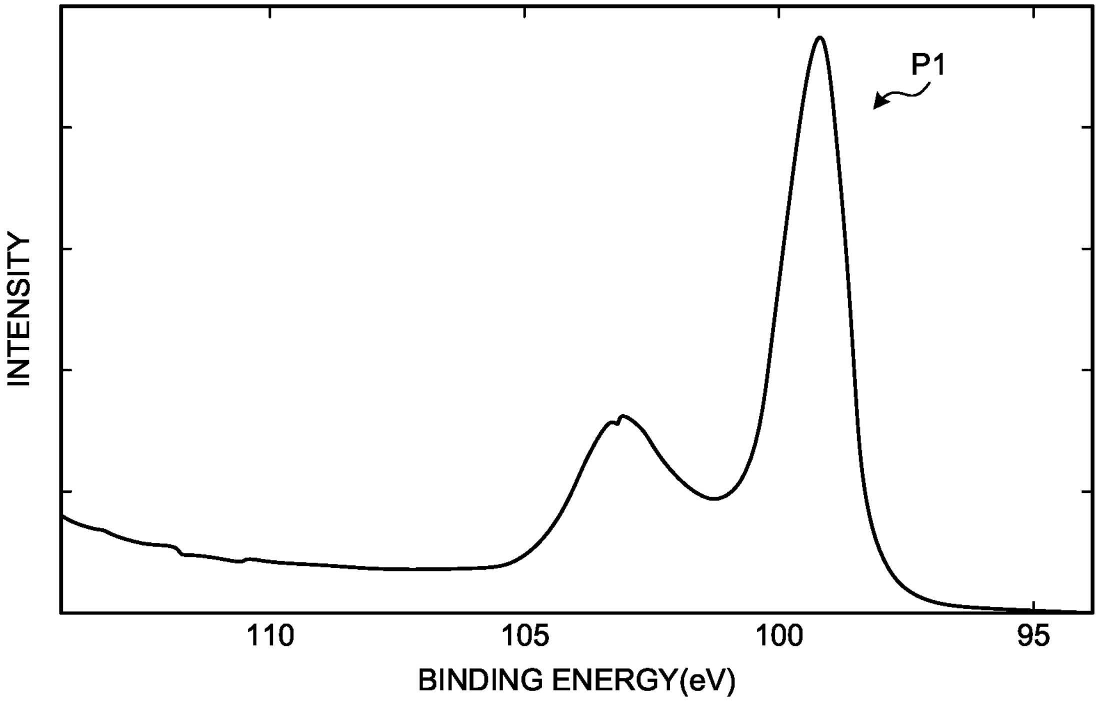
FIG. 5 is a diagram illustrating an example of a narrow spectrum of Si2p showing a measurement result of a silicon material by XPS.

The surface layer here means a range from the surface to a depth at which photoelectrons can escape from the inside of the sample, and is described in, for example, FIG. 5 of the paper J. D. Lee et al., Journal surface analysis Vol 16, No. 1 (2009) PP. 42-63. In addition, when the silicon particle 33 is measured by X-ray photoelectron spectroscopy under the above measurement conditions, a depth range in which photoelectrons can be observed may be referred to as a surface layer.

Since an extraction angle of photoelectrons with respect to the sample surface is 45°, in a case of a flat surface such as a Si wafer, it is 0.71 times the case of $\theta=90°$ from the measurement depth $d'=d \cos \theta$ ($\theta$ is a photoelectron extraction angle with respect to the sample surface, and d is a photoelectron escape depth) of photoelectrons to be detected. However, since the measurement was performed with particulate silicon spread on the flat plate this time, photoelectrons from the surface of each particle facing a detector are considered to be main, and thus, the photoelectron extraction angle with respect to the sample surface was not corrected.

In addition, Si in Si2p refers to a Si atom from which electrons in a 2p orbital jump out by X-ray photoelectron spectroscopy. Si in Si2p derived from $SiO_2$ refers to Si constituting $SiO_2$ from which electrons of a 2p orbital jump out by X-ray photoelectron spectroscopy, and Si in Si2p derived from elemental silicon refers to Si constituting elemental silicon (metal silicon) from which electrons of a 2p orbital jump out by X-ray photoelectron spectroscopy.

A ratio of the amount of Si in Si2p derived from elemental silicon to the amount of Si in Si2p derived from $SiO_2$ in the surface layer refers to a ratio of an atomic concentration of Si (Si atom) derived from elemental silicon from which electrons of a 2p orbital jump out to an atomic concentration of Si (Si atom) derived from $SiO_2$ from which electrons of a 2p orbital jump out in the surface layer (here, for example, from the outermost surface of the silicon particle 33 to a position about 6 angstroms deeper than the outermost surface). In the silicon particle 33, when the ratio of the amount of Si in Si2p derived from elemental silicon to Si in Si2p derived from $SiO_2$ is in this range (3.0 or more), the amount of oxide in the vicinity of the surface decreases, and the capacity of the negative electrode material can be improved. In addition, since the oxide layer on the surface becomes thin, entry and desorption of Li ions become easy, and impedance decreases. In addition, in the silicon particle 33, the ratio of the amount of Si in Si2p derived from elemental silicon to the amount of Si in Si2p derived from $SiO_2$ in the surface layer when measured by X-ray photoelectron spectroscopy is preferably 9 or less, more preferably 19 or less, and still more preferably 99 or less on an atomic concentration basis. In the silicon particle 33, when the ratio of the amount of Si to the amount of $SiO_2$ is in this range (99 or less), it is not required to prepare facilities or processes for excessively preventing oxidation of the silicon material, and it is possible to suppress a decrease in productivity while improving the capacity of the negative electrode material. As described above, when the silicon particle 33 is measured using X-ray photoelectron spectroscopy, the ratio of the amount of Si in Si2p derived from elemental silicon to the amount of Si in Si2p derived from $SiO_2$ in the surface layer is preferably 3 or more and 9 or less, more preferably 3 or more and 19 or less, and still more preferably 3 or more and 99 or less on an atomic concentration basis. In addition, when the silicon particle 33 is measured using X-ray photoelectron spectroscopy, the ratio of the amount of Si in Si2p derived from elemental silicon to the amount of Si in Si2p derived from $SiO_2$ in the surface layer is preferably 3.5 or more and 9 or less, more preferably 3.5 or more and 19 or less, and still more preferably 3.5 or more and 99 or less on an atomic concentration basis. Furthermore, when the silicon particle 33 is measured using X-ray photoelectron spectroscopy, the ratio of the amount of Si in Si2p derived from elemental silicon to the amount of Si in Si2p derived from $SiO_2$ in the surface layer is preferably 4 or more and 9 or less, more preferably 4 or more and 19 or less, and still more preferably 4 or more and 99 or less on an atomic concentration basis.

Note that, for example, when the amount of Si in Si2p derived from $SiO_2$ is 1%, the amount of Si in Si2p derived from elemental silicon is 99%. Therefore, when the ratio is taken, the ratio of the amount of Si in Si2p derived from elemental silicon to the amount of Si in Si2p derived from $SiO_2$ in the surface layer is 99. Similarly, when the amount of Si in Si2p derived from $SiO_2$ is 5%, the amount of Si in Si2p derived from elemental silicon is 95%. Therefore, when the ratio is taken, the ratio of the amount of Si in Si2p derived from elemental silicon to the amount of Si in Si2p derived from $SiO_2$ in the surface layer is 19.

Figure 4:
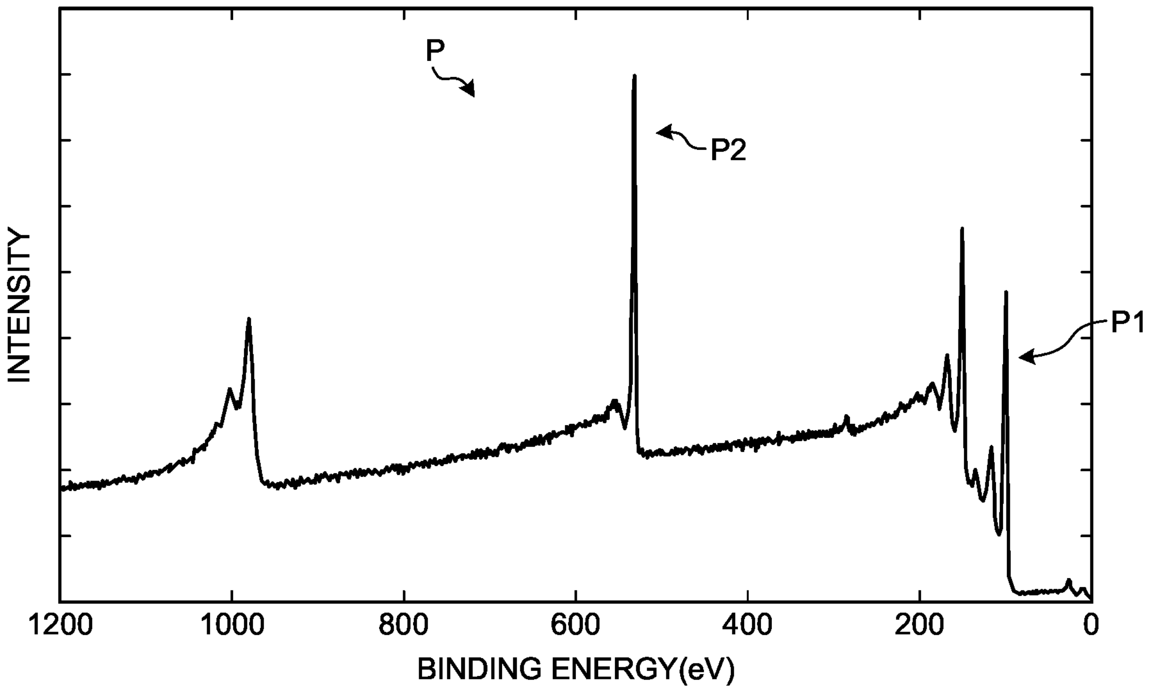
FIG. 4 is a diagram illustrating an example of a survey spectrum showing a measurement result of a silicon material by XPS.
Figure 6:
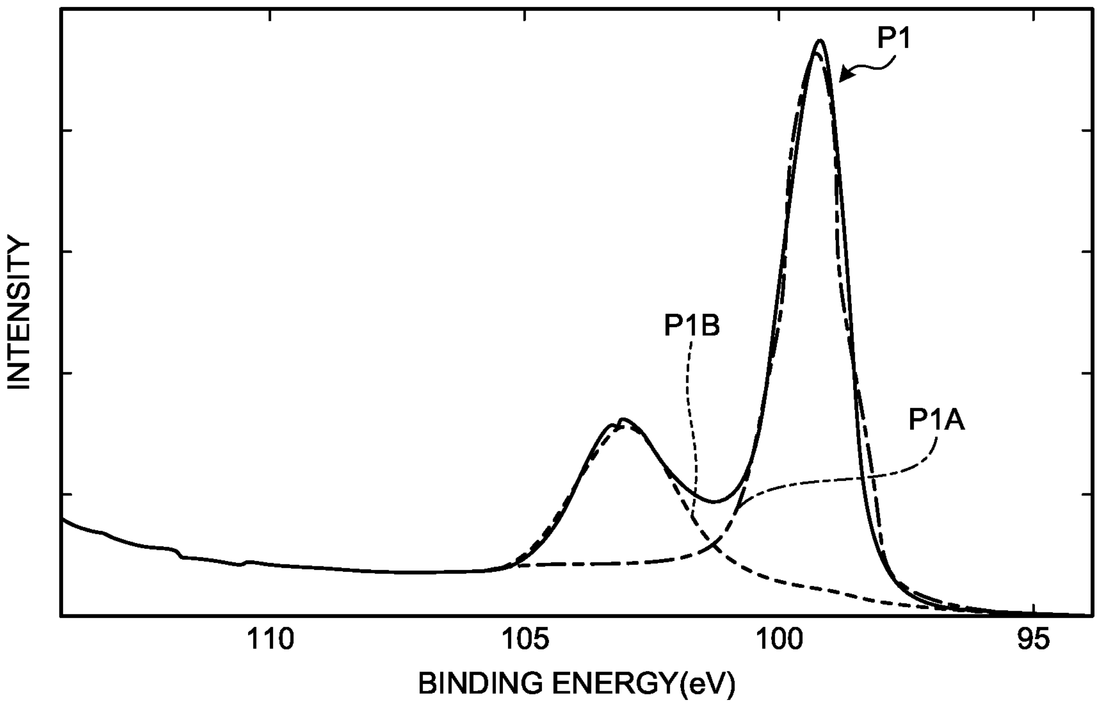
FIG. 6 is a diagram illustrating an example of peak separation of a narrow spectrum of Si2p showing a measurement result of a silicon material by XPS.
Figure 7:
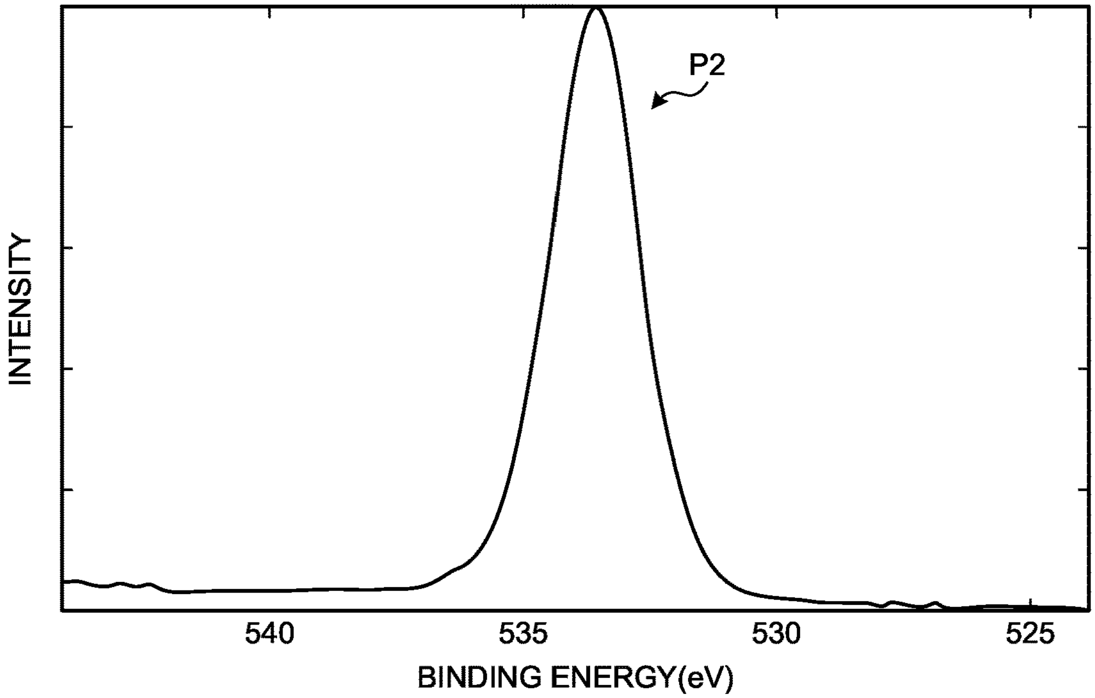
FIG. 7 is a diagram illustrating an example of a narrow spectrum of O1s showing a measurement result of a silicon material by XPS.

Here, a method for calculating the ratio of the amount of Si in Si2p derived from elemental silicon to the amount of Si in Si2p derived from $SiO_2$ when measured by X-ray photoelectron spectroscopy will be described. FIG. 4 is a diagram illustrating an example of a survey spectrum showing a measurement result of a silicon material by XPS, FIG. 5 is a diagram illustrating an example of a narrow spectrum of Si2p showing a measurement result of a silicon material by XPS, FIG. 6 is a diagram illustrating an example of peak separation of a narrow spectrum of Si2p showing a measurement result of a silicon material by XPS, and FIG. 7 is a diagram illustrating an example of a narrow spectrum of O1s showing a measurement result of a silicon material by XPS. FIG. 4 is an example of a peak waveform P of the silicon particles 33 in wide scan analysis, and the peak waveform P1 near a binding energy of 100 eV indicates a peak of Si2p. FIG. 5 is an example of a narrow spectrum of the silicon particles 33 in the narrow scan analysis in the vicinity of the peak waveform P1, in which the background is removed and the peak of Si2p is extracted. Here, Si in Si2p derived from $SiO_2$ and Si in Si2p derived from elemental silicon have different binding energies due to a difference in a bonding state. Therefore, as illustrated in FIG. 6, the peak waveform P1 can be separated into a peak waveform P1A indicating Si2p derived from elemental silicon and a peak waveform P1B indicating Si2p derived from $SiO_2$. The peak waveform P1A is a waveform having one peak near a binding energy of 99 eV, and the peak waveform P1B is a waveform having one peak near a binding energy of 103 eV. Background removal from the peak waveform was performed by using Multipak version 9.9.0.8 attached to an X-ray photoelectron spectrometer as software, and correction of the baseline was mainly performed by the Shirley method.

In the present embodiment, a ratio of an area of the peak waveform P1A to an area of the peak waveform P1B is calculated as a ratio of the amount of Si in Si2p derived from elemental silicon to the amount of Si in Si2p derived from $SiO_2$ on an atomic concentration basis.

Concentration Proportion of Si Derived from Si

In addition, a ratio of the atomic concentration of Si in Si2p derived from elemental silicon to the atomic concentration of Si in all Si2p (all Si from which electrons in the 2p orbital jump out) in the surface layer of the silicon particle 33 is defined as a concentration proportion of Si derived from Si (first Si concentration). A concentration proportion of Si derived from Si can be calculated as the ratio of the area of the peak waveform P1A to the area of the peak waveform P1. The concentration proportion of Si derived from Si is preferably 75% or more, more preferably 77% or more, and still more preferably 80% or more. When the concentration proportion of Si derived from Si is in this range, the amount of oxide in the vicinity of the surface is reduced, and the capacity of the negative electrode material can be improved. In addition, the concentration proportion of Si derived from Si is preferably 90% or less, more preferably 95% or less, and still more preferably 99% or less. When the concentration proportion of Si derived from Si is in this range, it is not required to prepare facilities or processes for excessively preventing oxidation of the silicon material, and it is possible to suppress a decrease in productivity while improving the capacity of the negative electrode material.

Concentration Proportion of Si Derived from $SiO_2$

In addition, the ratio of the atomic concentration of Si in Si2p derived from $SiO_2$ to the atomic concentration of Si in all Si2p in the surface layer of the silicon particle 33 is defined as a concentration proportion of Si derived from $SiO_2$. A concentration proportion of Si derived from $SiO_2$ can be calculated as the ratio of the area of the peak waveform P1B to the area of the peak waveform P1. The concentration proportion of Si derived from $SiO_2$ is preferably 25% or less, more preferably 24% or less, and still more preferably 20% or less. When the concentration proportion of Si derived from $SiO_2$ is in this range, the amount of oxide in the vicinity of the surface is reduced, and the capacity of the negative electrode material can be improved. In addition, the concentration proportion of Si derived from $SiO_2$ is preferably 10% or more, more preferably 5% or more, and still more preferably 1% or more. When the concentration proportion of Si derived from $SiO_2$ is in this range, it is not required to prepare facilities or processes for excessively preventing oxidation of the silicon material, and it is possible to suppress a decrease in productivity while improving the capacity of the negative electrode material.

Ratio of Amount of Si to Amount of O

In the silicon particle 33, a ratio of the amount of Si in Si2p to the amount of O in O1s in the surface layer when measured by X-ray photoelectron spectroscopy is preferably 1.0 or more, more preferably 1.1 or more, and still more preferably 1.3 or more on an atomic concentration basis.

O in O1s refers to an O atom from which electrons in a is orbital jump out by X-ray photoelectron spectroscopy.

A ratio of the amount of Si in Si2p to the amount of O in O1s in the surface layer refers to a ratio of an atomic concentration of Si (Si atom from which electrons in a 2p orbital jump out) in Si2p in the surface layer of the silicon particle 33 (for example, up to a depth of about 6 angstroms from the outermost surface) to an atomic concentration of O (O atom from which electrons in a is orbital jump out) in O1s in the surface layer of the silicon particle 33 (for example, up to a depth of about 10 angstroms from the outermost surface). In the silicon particle 33, when the ratio of the amount of Si in Si2p to the amount of O in O1s is in this range, the amount of oxide in the vicinity of the surface decreases, and the capacity of the negative electrode material can be improved. In particular, a silicon oxide (for example, SiO or the like) other than $SiO_2$ may also act as a factor for suppressing the improvement of the capacity. In such a case, the ratio of the amount of Si to the amount of O is in the above range, such that the amount of the silicon oxide other than $SiO_2$ can be reduced, and the capacity can be appropriately improved. In addition, in the silicon particle 33, the ratio of the amount of Si in Si2p to the amount of O in O1s in the surface layer when measured by X-ray photoelectron spectroscopy is preferably 4 or less, more preferably 9 or less, and still more preferably 99 or less on an atomic concentration basis. In the silicon particle 33, when the ratio of the amount of Si to the amount of O is in this range, it is not required to prepare excessively pure Si, and it is possible to suppress a decrease in productivity while improving the capacity of the negative electrode material. As described above, when the silicon particle 33 is measured using X-ray photoelectron spectroscopy, the ratio of the amount of Si in Si2p to the amount of O in O1s in the surface layer is preferably 1.0 or more and 4 or less, more preferably 1.0 or more and 9 or less, and still more preferably 1.0 or more and 99 or less on an atomic concentration basis. In addition, when the silicon particle 33 is measured using X-ray photoelectron spectroscopy, the ratio of the amount of Si in Si2p to the amount of O in O1s in the surface layer is preferably 1.1 or more and 4 or less, more preferably 1.1 or more and 9 or less, and still more preferably 1.1 or more and 99 or less on an atomic concentration basis. Furthermore, when the silicon particle 33 is measured using X-ray photoelectron spectroscopy, the ratio of the amount of Si in Si2p to the amount of O in O1s in the surface layer is preferably 1.3 or more and 4 or less, more preferably 1.3 or more and 9 or less, and still more preferably 1.3 or more and 99 or less on an atomic concentration basis.

Note that, for example, when the concentration of O is 20 at % and the concentration of Si is 80% at %, the ratio of the amount of Si in Si2p to the amount of O in O1s in the surface layer is 4, and when the concentration of O is 5 at % and the concentration of Si is 95% at %, the ratio of Si in Si2p to the amount of O in O1s in the surface layer is 19.

Here, a method for calculating the ratio of the amount of Si in Si2p to the amount of O in O1s when measured by X-ray photoelectron spectroscopy will be described. Qualitative analysis called a survey spectrum in FIG. 4 is performed. Next, for an element whose presence is confirmed by measurement of the survey spectrum, a narrow spectrum of a binding energy corresponding to an orbital level determined for each element is measured. For example, FIG. 5 illustrates a narrow spectrum of Si2p, and FIG. 7 illustrates a narrow spectrum of O1s. In addition, when there is a trace element, a narrow spectrum of the element is similarly measured. Background correction of each narrow spectrum is performed to obtain a peak area. The peak area is multiplied by a coefficient of sensitivity corresponding to an orbital level of each element to obtain a concentration of the element. A series of concentration calculations can be obtained using the analysis software Multi Pack attached to the PHI5000 Versa ProbeII. The results thus obtained are the concentration of Si (second Si concentration) and the concentration of O in FIG. 10. From this concentration, the ratio of Si/O was determined.

That is, the ratio of the concentration of Si to the concentration of O determined as described above is the Si/O ratio, that is, the ratio of the amount of Si in Si2p to the amount of O in O1s.

Concentration of Si

The concentration of Si is preferably 50 at % or more, more preferably 52 at % or more, and still more preferably 55 at % or more. When the concentration of Si is in this range, the amount of oxide in the vicinity of the surface is reduced, and the capacity of the negative electrode material can be improved. In addition, the concentration of Si is preferably 80 at % or less, more preferably 90 at % or less, and still more preferably 99 at % or less. When the concentration of Si is in this range, it is not required to prepare facilities or processes for excessively preventing oxidation of the silicon material, and it is possible to suppress a decrease in productivity while improving the capacity of the negative electrode material.

Concentration of O

The concentration of O is preferably 46 at % or less, more preferably 40 at % or less, and still more preferably 30 at % or less. When the concentration of O is in this range, the amount of oxide in the vicinity of the surface is reduced, and the capacity of the negative electrode material can be improved. In addition, the concentration of O is preferably 1 at % or more, more preferably 10 at % or more, and still more preferably 20 at % or more. When the concentration of O is in this range, it is not required to prepare facilities or processes for excessively preventing oxidation of the silicon material, and it is possible to suppress a decrease in productivity while improving the capacity of the negative electrode material.

Thickness of Oxide Layer

In the silicon particle 33, a thickness of the oxide layer 33B is preferably 2.3 angstroms or less, more preferably 2.0 angstroms or less, still more preferably 1.5 angstroms or less, and further still more preferably 1.3 angstroms or less. When the thickness of the oxide layer 33B is in this range, the amount of oxide in the vicinity of the surface is reduced, and the capacity of the negative electrode material can be improved. Furthermore, the contact resistance with the carbon particles 30 or the $Na_xWO_y$ particles 32 can be reduced, and the charge mobility is improved. In addition, the thickness of the oxide layer 33B is preferably 0.7 angstroms or more, more preferably 0.3 angstroms or more, and still preferably 0.06 angstroms or more. When the thickness of the oxide layer 33B is in this range, it is not required to prepare excessively pure Si, and it is possible to suppress a decrease in productivity while improving the capacity of the negative electrode material. Note that the thickness of the oxide layer 33B is calculated by multiplying the ratio (inverse of the ratio of the amount of Si in Si2p derived from elemental silicon to the amount of Si in Si2p derived from $SiO_2$) of the amount of Si in Si2p derived from $SiO_2$ to the amount of Si in Si2p derived from elemental silicon in the surface layer when measured by X-ray photoelectron spectroscopy by a photoelectron escape depth of 6 angstroms of Si in Si2p.

Characteristics of Silicon Material Based on Volume Average Particle Size

Next, characteristics of the silicon particle 33 based on a volume average particle size will be described.

Volume Average Particle Size

A volume average particle size (volume-based average particle size) of the silicon particles 33 measured by a laser diffraction scattering method is hereinafter referred to as a volume average particle size.

Volume Ratio of Oxide Layer Based on Volume Average Particle Size

In a case where a volume is calculated using the volume average particle size assuming that the silicon particles 33 are spherical, a ratio of a volume of the oxide layer 33B to a total volume of the silicon particles 33 is set as a volume ratio of the oxide layer 33B based on the volume average particle size. In this case, the volume ratio of the oxide layer 33B based on the volume average particle size is preferably 0.06% or less, more preferably 0.05% or less, and still more preferably 0.04% or less. When the volume ratio is in this range, the amount of oxide in the vicinity of the surface is reduced, and the capacity of the negative electrode material can be improved. Furthermore, the contact resistance with the carbon particles 30 or the $Na_xWO_y$ particles 32 can be reduced, and the charge mobility is improved. In addition, the volume ratio of the oxide layer 33B based on the volume average particle size is preferably 0.015% or more, more preferably 0.01% or more, and still more preferably 0.001% or more. When the volume ratio is in this range, it is not required to prepare facilities or processes for excessively preventing oxidation of the silicon material, and it is possible to suppress a decrease in productivity while improving the capacity of the negative electrode material.

The volume ratio of the oxide layer 33B based on the volume average particle size can be calculated as follows. That is, assuming that the silicon particles 33 are spherical (true sphere), the volume of the silicon particles 33 is calculated using the volume average particle size as a diameter of the silicon particle 33. Then, a diameter of the Si layer 33A is calculated by subtracting the thickness of the oxide layer 33B calculated as described above from the volume average particle size, and assuming that the Si layer 33A is spherical (true sphere), the volume of the Si layer 33A is calculated using the diameter of the Si layer 33A. A value obtained by subtracting the volume of the Si layer 33A from the volume of the silicon particles 33 calculated in this manner is defined as the volume of the oxide layer 33B. A ratio of the volume of the oxide layer 33B to the volume of the silicon particles 33 is defined as a volume ratio of the oxide layer 33B based on the volume average particle size.

Characteristics of Silicon Material Based on D50

Next, characteristics of the silicon particle 33 based on D50 will be described.

D50

In a volume-based particle size distribution measured by a laser diffraction scattering method, a particle size having a cumulative frequency of 50 vol % is defined as D50.

Volume Ratio of Oxide Layer Based on D50

Here, in a case where a volume is calculated D50 assuming that the silicon particles 33 are spherical, a ratio of a volume of the oxide layer 33B to a total volume of the silicon particles 33 is set as a volume ratio of the oxide layer 33B based on D50. In this case, the volume ratio of the oxide layer 33B based on D50 is preferably 0.4% or less, more preferably 0.3% or less, and still more preferably 0.25% or less. When the volume ratio is in this range, the amount of oxide in the vicinity of the surface is reduced, and the capacity of the negative electrode material can be improved. In addition, the volume ratio of the oxide layer 33B based on D50 is preferably 0.13% or more, more preferably 0.05% or more, and still more preferably 0.01% or more. When the volume ratio is in this range, it is not required to prepare facilities or processes for excessively preventing oxidation of the silicon material, and it is possible to suppress a decrease in productivity while improving the capacity of the negative electrode material.

The volume ratio of the oxide layer 33B based on D50 can be calculated as follows. That is, assuming that the silicon particles 33 are spherical (true sphere), the volume of the silicon particles 33 is calculated using D50 as a diameter of the silicon particle 33. Then, a diameter of the Si layer 33A is calculated by subtracting the thickness of the oxide layer 33B calculated as described above from D50, and assuming that the Si layer 33A is spherical (true sphere), the volume of the Si layer 33A is calculated using the diameter of the Si layer 33A. A value obtained by subtracting the volume of the Si layer 33A from the volume of the silicon particles 33 calculated in this manner is defined as the volume of the oxide layer 33B. A ratio of the volume of the oxide layer 33B to the volume of the silicon particles 33 is defined as a volume ratio of the oxide layer 33B based on D50.

Positive Electrode

The positive electrode 16 illustrated in FIG. 1 includes a current collecting layer and a positive electrode material layer. The current collecting layer of the positive electrode 16 is a layer formed of a conductive member, and examples of the conductive member here include aluminum. The positive electrode material layer is a layer of a positive electrode material, and is provided on a surface of the current collecting layer of the positive electrode 16. A thickness of the current collecting layer of the positive electrode may be, for example, about 10 μm or more and 30 μm or less, and a thickness of the positive electrode material layer may be, for example, about 10 μm or more and 100 μm or less.

The positive electrode material layer contains a positive electrode material. The positive electrode material includes particles of a lithium compound which is a compound containing lithium. The lithium compound may be a lithium-containing metal oxide, a lithium-containing phosphate, or the like. More specifically, examples of the lithium compound include $LiCoO_2$, $LiNiO_2$, $LiMnO_2$, $LiMn_2O_4$, $LiNi_aCo_bMn_cO_2$ (where $0<a<1$, $0<b<1$, $0<c<1$, and $a+b+c=1$), and $LiFePO_4$. The lithium compound may contain only one kind of material or two or more kinds of materials. In addition, the positive electrode material layer may contain a substance other than the positive electrode material, and may contain, for example, a binder. The material of the binder may be any material, and examples thereof include polyvinylidene fluoride (PVDF), polytetrafluoroethylene (PTFE), and PAA. The binders may be used alone or in combination of two or more.

Separator

The separator 18 illustrated in FIG. 1 is an insulating member. In the present embodiment, the separator 18 is, for example, a porous film formed of a resin, and examples of the resin include polyethylene (PE) and polypropylene (PP). In addition, the separator 18 may have a structure in which films of different materials are stacked. In addition, the separator 18 may include a heat resistant layer. The heat resistant layer is a layer containing a substance having a high melting point. The heat resistant layer may include, for example, particles of an inorganic material such as alumina.

Electrolyte

The electrolyte provided in the battery 1 is a non-aqueous electrolyte. Voids in the electrode group 12 are impregnated with the electrolyte. The electrolyte contains, for example, a lithium salt and an aprotic solvent. The lithium salt is dispersed and dissolved in an aprotic solvent. Examples of the lithium salt include $LiPF_6$, $LiBF_4$, $Li[N(FSO_2)_2]$, $Li[N(CF_3SO_2)_2]$, $Li[B(C_2O_4)_2]$, and $LiPO_2F_2$. The aprotic solvent may be, for example, a mixture of a cyclic carbonate ester and a chain carbonate ester. Examples of the cyclic carbonate ester include EC, PC, and butylene carbonate. Examples of the cyclic carbonate ester include dimethyl carbonate (DMC), ethyl methyl carbonate (EMC), and diethyl carbonate (DEC).

Method for Producing Battery

Next, an example of a method for producing the battery 1 according to the present embodiment will be described. The present production method includes a step of preparing a silicon raw material under an atmosphere having an oxygen concentration of 5% or less; a step of producing a negative electrode material by providing sodium tungstate and a silicon material on a surface of carbon using the silicon raw material; and a step of producing a positive electrode material.

Step of Preparing Silicon Raw Material

Figure 8:
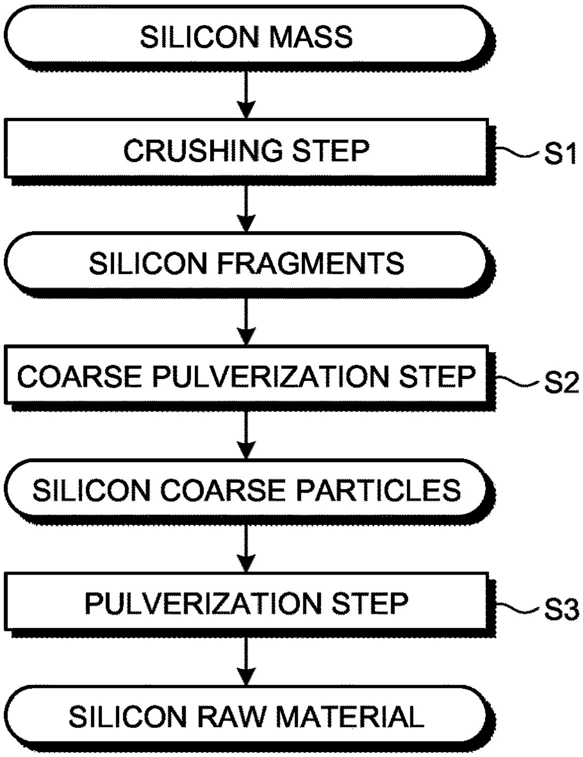
FIG. 8 is a flowchart for explaining steps of preparing a silicon raw material.

FIG. 8 is a flowchart for explaining steps of preparing a silicon raw material. The silicon raw material is a raw material of the silicon particle 33. As illustrated in FIG. 8, the step of preparing a silicon raw material includes a crushing step S1, a coarse pulverization step S2, and a pulverization step S3.

In the step of preparing the silicon raw material, it is preferable to prepare the silicon raw material by pulverizing a silicon base material under an atmosphere having an oxygen concentration of 5% or less, the oxygen concentration is more preferably 3% or less, and the oxygen concentration is still more preferably 1% or less and further still more preferably 0.1% or less. When the oxygen concentration is as low as described above, oxidation of a new surface of silicon appearing after crushing and a further increase in thickness of an oxide layer formed on the surface before crushing can be suppressed to suppress a decrease in capacity. Note that the oxygen concentration can be measured by an oxygen monitor OM-25MF01 manufactured by Taiei Engineering Co., Ltd., and when the oxygen concentration is less than 1%, the oxygen concentration can be measured by a low concentration oxygen monitor JKO-O2LJD3 manufactured by ICHINEN MANUFACTURING Co., LTD. In addition, in the coarse pulverization step S2 and the pulverization step S3, the oxygen concentration is preferably set to the above range, and in all the steps of the crushing step S1, the coarse pulverization step S2, and the pulverization step S3, the oxygen concentration is more preferably set to the above range.

Crushing Step

The crushing step S1 is a step of crushing a silicon mass to obtain silicon fragments. A size of the silicon mass is not particularly limited. A shape of the silicon mass is not particularly limited, and may be, for example, a columnar shape, a plate shape, or a granular shape. As the silicon mass, a silicon chunk, polycrystalline silicon other than the chunk, a lump of single crystal silicon and a columnar crystal silicon ingot, a monitoring silicon wafer, a dummy silicon wafer, or granular silicon can be used.

A crushing device for crushing the silicon mass is not particularly limited, and for example, a hammer crusher, a jaw crusher, a gyratory crusher, a cone crusher, a roll crusher, or an impact crusher can be used. A size of the silicon fragments obtained by crushing the silicon mass is preferably in a range in which the longest diameter is more than 1 mm and 5 mm or less.

Coarse Pulverization Step

The coarse pulverization step S2 is a step of obtaining silicon coarse particles by coarsely pulverizing the silicon fragments. The silicon coarse particles obtained in the coarse pulverization step S2 preferably have a maximum particle size of 1,000 μm or less as fractionated by a sieving method. Therefore, the coarse pulverization step S2 preferably includes a step of classifying a coarsely pulverized product obtained by the coarse pulverization using a sieve having a mesh size of 1,000 μm to recover coarse particles having a maximum particle size of 1,000 μm or less. When the size of the silicon coarse particle exceeds 1,000 μm, there is a risk that the silicon coarse particles are not sufficiently pulverized in the next pulverization step S3, and the particles are mixed. A maximum particle size of the silicon coarse particles is particularly preferably 500 μm or less.

The coarse pulverization may be performed by either a dry method or a wet method, but is preferably performed by a dry method. A pulverizer for coarsely pulverizing the silicon fragments is not particularly limited, and for example, a ball mill (a planetary ball mill, a vibration ball mill, a rolling ball mill, or a stirring ball mill), a jet mill, or a three-dimensional ball mill can be used.

Pulverization Step

The pulverization step S3 is a step of obtaining a silicon raw material (silicon fine particles) by pulverizing the silicon coarse particles. In the pulverization step S3, for example, a ball mill (a planetary ball mill, a vibration ball mill, a rolling ball mill, or a stirring ball mill), a jet mill, or a three-dimensional ball mill can be used. It is preferable to use a three-dimensional ball mill of Nagao System Inc. as the pulverizer.

As a hard ball, a zirconia ($ZrO_2$) ball or alumina ($Al_2O_3$) ball can be used. A ball size of the hard ball is preferably in a range of 0.1 mm or more and 20 mm or less. When the ball size of the hard ball is within this range, the silicon coarse particles can be efficiently pulverized. The amount of the hard balls used is preferably in a range of 500 parts by mass or more and 2,500 parts by mass or less as an amount with respect to 100 parts by mass of the silicon coarse particles. When the amount of the hard balls used is within this range, the silicon coarse particles can be efficiently pulverized. The amount of the hard balls used is more preferably in a range of 1,000 parts by mass or more and 2,000 parts by mass or less, and particularly preferably in a range of 1,100 parts by mass or more and 1,500 parts by mass or less.

A filling rate of the silicon coarse particles and the hard balls in a container with three-dimensional ball mills is preferably within a range of 3% or more and 35% or less as a total volume amount of the silicon coarse particles and the hard balls with respect to the capacity of the container. When the filling rate is too small, the pulverization efficiency may be reduced and the production cost may be increased. On the other hand, when the filling rate is too large, pulverization hardly proceeds, and an average particle size of the silicon raw material to be obtained increases, or the silicon coarse particles may not be sufficiently pulverized, and the particles may remain. The filling rate of the silicon coarse particles and the hard balls is more preferably in a range of 15% or more and 30% or less, and particularly preferably in a range of 20% or more and 30% or less. Note that the filling rate is a volume assumed to be 100% when the inside of the container is filled with the raw material and the hard balls without gaps. For example, the filling rate is 50% when half of the spherical container is filled with the raw material and the hard balls, and the filling rate is 15.6% when half of the spherical container is filled with the raw material and the hard balls to a height of 1/2 of the spherical container.

The container is preferably filled with a non-oxidizing gas. By using the container filled with a non-oxidizing gas, aggregation of particles due to moisture absorption of silicon fine particles and oxidation of silicon fine particles can be suppressed. As the non-oxidizing gas, argon, nitrogen, or carbon dioxide can be used.

In a method for producing the silicon raw material of the present embodiment, silicon coarse particles having a maximum particle size of 1,000 μm or less as measured by a sieving method are prepared in the coarse pulverization step S2, and the silicon coarse particles are pulverized under predetermined conditions using a three-dimensional ball mill in the next pulverization step S3. Therefore, it is possible to industrially advantageously produce a silicon raw material which is fine, hardly forms coarse aggregated particles, and has high dispersibility when mixed with other raw material particles.

Although the method for producing the silicon raw material has been described above, the production method is not limited to the above and may be arbitrary.

Step of Producing Negative Electrode Material and Positive Electrode Material

Figure 9:
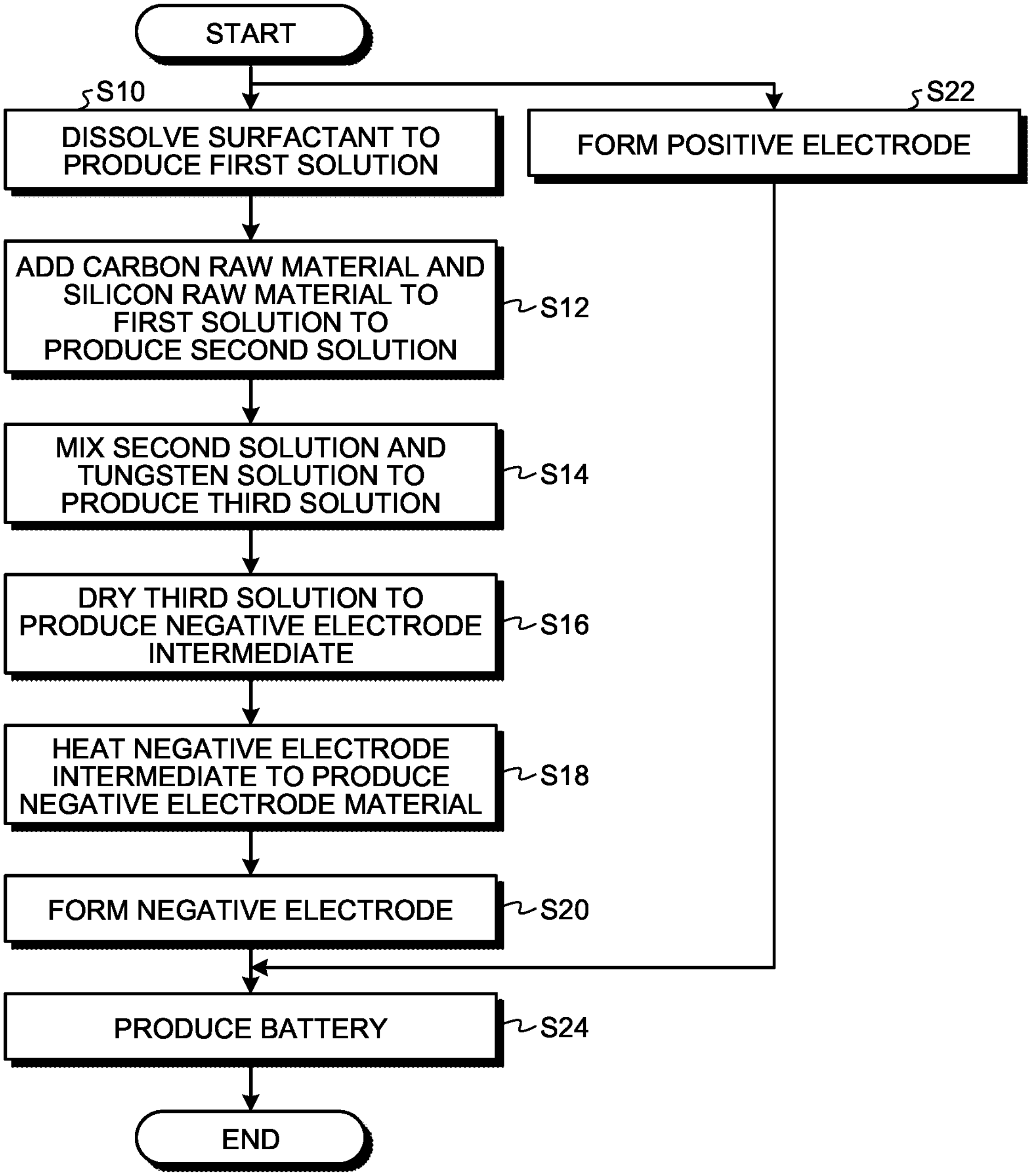
FIG. 9 is a flowchart for explaining an example of a method for producing a battery of the present embodiment.

FIG. 9 is a flowchart for explaining an example of a method for producing a battery of the present embodiment. As illustrated in FIG. 9, in the present production method, the negative electrode 14 is formed in Step S10 to Step S20.

Specifically, a surfactant is dissolved in a solvent to produce a first solution (Step S10). The first solution is a solution in which a surfactant is dissolved and Na (Na in an ionic state) is contained. The surfactant is used to disperse amorphous carbon. As the surfactant, any substance capable of dispersing amorphous carbon may be used, and in the present embodiment, a substance containing Na is used. As the surfactant containing Na, for example, sodium dodecyl sulfate (SDS) may be used. The solvent of the first solution may be any solvent that dissolves the surfactant, and for example, water may be used.

Note that the surfactant is not limited to a surfactant containing Na. In this case, for example, a surfactant not containing Na and a compound containing Na may be dissolved in a solvent to produce the first solution. As the surfactant not containing Na, for example, poly(oxyethylene) alkyl ether, polyoxyethylene nonylphenyl ether, or the like may be used. As the poly(oxyethylene) alkyl ether, poly(oxyethylene) alkyl ether having an alkyl group having 12 or more and 15 or fewer carbon atoms is preferably used, and for example, $C_{12}H_{25}O(C_2H_4)_nH$ (poly(oxyethylene) dodecyl ether), $C_{13}H_{27}O(C_2H_4)_nH$ (poly(oxyethylene) tridecyl ether), $C_{13}H_{27}O(C_2H_4)_nH$ (poly(oxyethylene) isotridecyl ether), $C_{14}H_{25}O(C_2H_4)$ H (poly(oxyethylene) tetradecyl ether), $C_{155}H_{25}O(C_2H_4)_nH$ (poly(oxyethylene) pentadecyl ether), or the like may be used. Here, n is an integer of 1 or more. As the polyoxyethylene nonylphenyl ether, for example, $C_9H_{19}C_6(CH_2CH_2O)_8H$, $C_9H_{19}C_6(CH_2CH_2O)_{10}H$, $C_9H_{19}C_6(CH_2CH_2O)_{12}H$, or the like may be used. As the compound containing Na, for example, sodium sulfate, sodium stearate, sodium hyaluronate, sodium hypochlorite, or the like may be used.

A content of the surfactant in the first solution, that is, the amount of the surfactant added is preferably 0.1% or more and 10% or less, more preferably 0.5% or more and 7% or less, and still more preferably 1% or more and 5% or less in terms of a mass ratio with respect to the amount of the carbon raw material added in the subsequent Step S12. In this numerical range, the affinity between carbon and $Na_xWO_y$ can be appropriately improved.

Next, a carbon raw material and a silicon raw material are added to the first solution to produce a second solution (Step S12). The carbon raw material is carbon used as a raw material of the carbon particle 30. An average particle size of the carbon raw material is, for example, preferably 1 μm or more and 50 μm or less, and more preferably 1 μm or more and 20 μm or less. When the average particle size of the carbon raw material is in this range, the capacity of the battery can be increased. In Step S12, the first solution to which the carbon raw material and the silicon raw material are added, that is, the second solution is stirred to disperse the amorphous carbon raw material and the silicon raw material in the first solution. That is, the second solution can be said to be the first solution in which the amorphous carbon raw material and the silicon raw material are dispersed.

Note that, in the present step, the order of addition of the silicon raw material and the carbon raw material to the first solution may be arbitrary. For example, the silicon raw material may be first added to the first solution and stirred, and then the carbon raw material may be added and stirred. In addition, for example, the carbon raw material may be first added to the first solution and stirred, and then the silicon raw material may be added and stirred. In addition, for example, the carbon raw material and the silicon raw material may be simultaneously added to the first solution and stirred.

The carbon raw material may be produced, for example, by an oil furnace method. In the oil furnace method, for example, a raw material oil is sprayed into a high-temperature atmosphere to be thermally decomposed, and then rapidly cooled to produce a particulate carbon raw material. However, the method for producing the carbon raw material is not limited thereto, and may be any method.

Next, the second solution and a tungsten solution are mixed to produce a third solution (Step S14). The tungsten solution is a solution containing W and O. The tungsten solution is, for example, a solution produced by dissolving a tungsten oxide raw material in a solvent. The tungsten oxide raw material here is a raw material of the $Na_xWO_y$ particles 32, and for example, tungsten trioxide is used. As the solvent, for example, an alkaline liquid is used, and in the present embodiment, an aqueous ammonia solution is used. Therefore, in the present embodiment, the tungsten solution is an alkaline solution containing W and O, more specifically, ammonium tungstate. However, the tungsten solution may be any solution containing W and O.

A content of W contained in the tungsten solution added to the second solution, that is, the amount of W added is preferably 0.5% or more and 20% or less, more preferably 1% or more and 15% or less, and still more preferably 1.3% or more and 10% or less in terms of a mass ratio with respect to the amount of the carbon raw material added in Step S12. In this numerical range, the affinity between carbon and $Na_xWO_y$ can be appropriately improved.

Next, a liquid component of the third solution is removed to produce a negative electrode material (negative electrode material production step). In the present embodiment, Steps S16 and S18 are executed as the negative electrode material production steps. Specifically, the third solution is dried to produce a negative electrode intermediate (Step S16; drying step). In Step S16, for example, the liquid component contained in the added solution is removed, that is, evaporated by drying the third solution at 80° C. for 12 hours in the atmosphere. However, the drying conditions may be arbitrary. It can be said that the negative electrode intermediate contains a solid component remaining after the liquid component of the third solution is removed.

Next, the negative electrode intermediate is heated to produce a negative electrode material (Step S18; heating step). By heating the negative electrode intermediate, a negative electrode material in which the $Na_xWO_y$ particles 32 and the silicon particles 33 are provided on the surface of the carbon particle 30 is formed. That is, Na, W, and O in an ionic state contained in the third solution are precipitated as the $Na_xWO_y$ particles 32 on the surface of the carbon particle 30 dispersed in the third solution, and a negative electrode material is formed.

The conditions for heating the negative electrode intermediate in the heating step may be arbitrary, and the heating step is preferably performed as follows. That is, the heating step preferably includes a step of putting the negative electrode intermediate into a furnace to make the inside of the furnace an inert atmosphere, a first heating step of heating the negative electrode intermediate to a first temperature at a first heating rate, and a second heating step of heating the negative electrode intermediate heated to the first temperature to a second temperature at a second heating rate.

The inert atmosphere in the step of making the inside of the furnace an inert atmosphere may be, for example, a nitrogen atmosphere or a rare gas atmosphere such as Ar. For example, the inert atmosphere may be created by replacing oxygen in the furnace with nitrogen or a rare gas. Note that this step is not essential.

The first heating step is a step of removing metals, organic substances, and the like contained in the negative electrode intermediate. The first heating temperature in the first heating step is, for example, 550° C., but is not limited thereto, and is preferably 150° C. or higher and 625° C. or lower, preferably 175° C. or higher and 600° C. or lower, and more preferably 200° C. or higher and 575° C. or lower. The first heating rate may be any rate. For example, the first heating rate is preferably 45° C./hour or more and 75° C./hour or less, more preferably 50° C./hour or more and 70° C./hour or less, and still more preferably 55° C./hour or more and 65° C./hour or less. When the first heating temperature and the first heating rate are in these ranges, metals, organic substances, and the like contained in the negative electrode intermediate can be appropriately removed.

The second heating step is a step of producing $Na_xWO_y$ after the first heating step. The second heating temperature in the second heating step is higher than the first heating temperature, for example, 700° C., but is not limited thereto, and is preferably 680° C. or higher and 750° C. or lower, preferably 685° C. or higher and 740° C. or lower, and more preferably 690° C. or higher and 730° C. or lower. The second heating rate may be any rate. The second heating rate is preferably higher than the first heating rate, and for example, is preferably 165° C./hour or more and 195° C./hour or less, more preferably 170° C./hour or more and 190° C./hour or less, and still more preferably 175° C./hour or more and 185° C./hour or less. When the second heating temperature and the second heating rate are in these ranges, $Na_xWO_y$ can be appropriately produced while shortening the time required for the process.

In the second heating step, the negative electrode intermediate heated to the second heating temperature is preferably held at the second heating temperature for a predetermined time. The holding time here is preferably 1.25 hours or longer and 2.75 hours or shorter, more preferably 1.5 hours or longer and 2.5 hours or shorter, and still more preferably 1.75 hours or longer and 2.25 hours or shorter.

Note that the step of heating the negative electrode intermediate to the third temperature at the third heating rate and holding the negative electrode intermediate at the third temperature for a predetermined time may be provided before the first heating step (and after the step of creating the inert atmosphere in the present embodiment). The third temperature is lower than the first temperature, and is, for example, 100° C., but is not limited thereto, and is preferably 80° C. or higher and 120° C. or lower, preferably 85° C. or higher and 115° C. or lower, and more preferably 90° C. or higher and 110° C. or lower. The third heating rate may be any rate. For example, the third heating rate is preferably 165° C./hour or more and 195° C./hour or less, more preferably 170° C./hour or more and 190° C./hour or less, and still more preferably 175° C./hour or more and 185° C./hour or less. In addition, the predetermined time for holding at the third heating temperature may also be arbitrary, and for example, is preferably 0.5 hours or longer and 1.75 hours or shorter, more preferably 0.75 hours or longer and 1.5 hours or shorter, and still more preferably 1.0 hour or longer and 1.25 hours or shorter. By providing this step, moisture can be appropriately removed.

Next, the negative electrode 14 is formed using the formed negative electrode material (Step S20). That is, the negative electrode material layer 22 containing a negative electrode material is formed on the surface of the current collecting layer 20 to form the negative electrode 14.

In addition, in the present production method, the positive electrode 16 is formed (Step S22). In Step S22, a positive electrode material may be formed by the same method as in Steps S10 to S20 except that a lithium compound raw material which is a lithium compound is used instead of the carbon raw material and the silicon raw material. Then, a positive electrode material layer containing a positive electrode material is formed on the surface of the current collecting layer for the positive electrode 16 to form the positive electrode 16.

After the negative electrode 14 and the positive electrode 16 are formed, the battery 1 is produced using the negative electrode 14 and the positive electrode 16 (Step S24). Specifically, the negative electrode 14, the separator 18, and the positive electrode 16 are stacked to form the electrode group 12, and the electrode group 12 and the electrolyte are housed in the casing 10 to produce the battery 1.

Although the method for producing the negative electrode material and the positive electrode material has been described above, the production method is not limited to the above and may be arbitrary.

Effects

As described above, the negative electrode material according to the present embodiment is a negative electrode material for a battery, and includes carbon, sodium tungstate, and silicon particles 33 including silicon. In the silicon particle 33, a ratio of the amount of Si in Si2p derived from elemental silicon to the amount of Si in Si2p derived from $SiO_2$ in the surface layer when measured by X-ray photoelectron spectroscopy is 3 or more on an atomic concentration basis.

Here, when a tungsten compound or Si is provided in the negative electrode material, the performance of the battery can be improved. However, further improvement in performance is required, and as a result of intensive studies, the present inventors have found that an oxide of Si as a raw material suppresses improvement in capacity. In contrast, in the negative electrode material according to the present embodiment, a ratio of the amount of Si in Si2p derived from elemental silicon to the amount of Si in Si2p derived from $SiO_2$ in the surface layer is 3 or more on an atomic concentration basis. Therefore, according to the present embodiment, the oxide of silicon can be reduced, and the performance of the battery can be improved.

In addition, in the silicon particle 33, a ratio of the amount of Si in Si2p to the amount of O in O1s in the surface layer when measured by X-ray photoelectron spectroscopy is preferably 1.0 or more on an atomic concentration basis. In the negative electrode material according to the present embodiment, when the ratio of the amount of Si in Si2p to the amount of O in O1s in the silicon particle 33 is in this range, the amount of oxide in the vicinity of the surface decreases, and the capacity of the battery can be improved.

In particular, a silicon oxide (for example, SiO or the like) other than $SiO_2$ may also act as a factor for suppressing the improvement of the capacity. In such a case, the ratio of the amount of Si in Si2p to the amount of O in O1s is in the above range, such that the amount of the silicon oxide other than $SiO_2$ can be reduced, and the performance of the battery can be appropriately improved.

In addition, the silicon particle 33 includes the Si layer 33A formed of Si and the oxide layer 33B formed on the surface of the Si layer 33A and formed of an oxide of silicon, and in a case where the silicon particles 33 are assumed to be spherical and the volume of the silicon particles 33 is calculated using the volume average particle size, a volume of the oxide layer 33B is preferably 0.06% or less with respect to the total volume of the silicon particles 33. When the volume ratio of the oxide layer 33B is in this range, the amount of oxide in the vicinity of the surface is reduced, and the performance of the battery can be improved.

In addition, the silicon particle 33 includes the Si layer 33A formed of Si and the oxide layer 33B formed on the surface of the Si layer 33A and formed of an oxide of silicon, and in a case where the silicon particles 33 are assumed to be spherical and the volume of the silicon particles 33 is calculated using a particle size D50 with a cumulative frequency of 50 vol % in volume-based particle size distribution measured by a laser diffraction scattering method, the volume of the oxide layer 33B is preferably 0.4% or less with respect to the total volume of the silicon particles 33. When the volume ratio of the oxide layer 33B is in this range, the amount of oxide in the vicinity of the surface is reduced, and the performance of the battery can be improved.

In addition, in the negative electrode material, when the total content of the carbon, the sodium tungstate, and the silicon particles 33 is 100 wt %, the content of the silicon particles 33 is preferably 1 wt % or more and 10 wt % or less. When the content of the silicon particles 33 is in this range, the performance of the battery can be improved.

In addition, in the negative electrode material according to the present embodiment, sodium tungstate is represented by a chemical formula of $Na_xWO_y$, x is preferably more than 0 and 1 or less, and y is preferably 2 or more and 4 or less. By including sodium tungstate of such a chemical formula, sodium tungstate can be appropriately disposed on the surface of the carbon.

In addition, the negative electrode material according to the present embodiment preferably has a content of sodium of 0.01% or more and 0.5% or less in terms of a mass ratio, a content of tungsten of 0.5% or more and 20% or less in terms of a mass ratio, and a content of oxygen of 1% or more and 15% or less in terms of a mass ratio when measured by fluorescent X-ray analysis. When Na, W, and O are in these ranges, sodium tungstate is appropriately included, and thus, sodium tungstate can be appropriately disposed on the surface of the carbon.

In addition, the negative electrode material according to the present embodiment preferably has Na/W, which is a content ratio of sodium to tungsten, of 0.001 or more and 0.2 or less when measured by fluorescent X-ray analysis. When Na/W is in this range, sodium tungstate is appropriately included, and thus, sodium tungstate can be appropriately disposed on the surface of the carbon.

A method for producing a negative electrode material according to the present embodiment includes a step of preparing a silicon raw material under an atmosphere having an oxygen concentration of 5% or less; and a step of producing a negative electrode material including carbon, sodium tungstate, and silicon particles 33 by using the silicon raw material, in which in the silicon particle 33, a ratio of the amount of Si in Si2p of elemental silicon to the amount of Si in Si2p caused by $SiO_2$ in a surface layer when measured by X-ray photoelectron spectroscopy is preferably 3 or more on an atomic concentration basis. By preparing the silicon raw material at a low oxygen concentration in this manner, oxidation of silicon can be suppressed, and the performance of the battery can be improved.

EXAMPLES

Next, Examples will be described.

Example 1

Preparation of Silicon Raw Material

A scaly polycrystalline silicon chunk (purity: 99.999999999 mass %, length: 5 to 15 mm, width: 5 to 15 mm, thickness: 2 to 10 mm) was crushed using a hammer mill. Next, the obtained pulverized product was dry-classified using a sieve with a mesh size of 5 mm to obtain silicon fragments under the sieve.

The obtained silicon fragments, hard balls (zirconia balls, diameter: 10 mm), and an 80 mmΦ $ZrO_2$ spherical container that can be divided into one container and the other container were housed in a glove box filled with Ar gas. In the glove box, 30 parts by mass of the silicon fragments and 380 parts by mass of the hard balls were put into one of the containers. Next, one container into which the silicon fragments and the hard balls were put and the other container were combined, and the two containers were screwed and sealed in a glove box filled with Ar gas. A mating surface of the two containers is a mating surface so as to maintain airtightness. A filling rate of the silicon fragments and the hard balls in the container was set to 28%.

An 80 mmΦ $ZrO_2$ spherical container filled with the silicon fragments and the hard balls was taken out from the glove box and set in a three-dimensional ball mill apparatus. Then, coarse pulverization was performed under conditions of a rotation speed of a first rotation shaft of 300 rpm, a rotation speed of a second rotation shaft of 300 rpm, and a pulverization time of 0.33 hours. The silicon coarsely pulverized product and the hard balls after the coarse pulverization were dry-classified using a sieve with a mesh size of 1,000 μm to obtain silicon coarse particles having a maximum particle size of 1,000 μm or less.

The obtained silicon coarse particles, hard balls (zirconia balls, diameter: 10 mm), and a hemispherical container were each housed in a glove box filled with Ar gas. Next, in the glove box, 15 parts by mass of the silicon fragments and 200 parts by mass of the hard balls were put into one of the hemispherical containers (the amount of the hard balls was 1,333 parts by mass with respect to 100 parts by mass of the silicon coarse particles). Next, one hemispherical container into which the silicon fragments and the hard balls were put and the other hemispherical container were combined to form a spherical container, and the two containers were screwed and sealed in a glove box filled with Ar gas. A filling rate of the silicon fragments and the hard balls in the container was set to 15%.

An 80 mmΦ $ZrO_2$ spherical container filled with the silicon coarse particles and the hard balls was taken out from the glove box and set in a three-dimensional ball mill apparatus. Then, pulverization was performed under conditions of a rotation speed of a first rotation shaft of 300 rpm, a rotation speed of a second rotation shaft of 300 rpm, and a pulverization time of 6 hours to obtain a silicon raw material.

Preparation of Negative Electrode Material

In Example 1, a negative electrode material was produced by the method described in the embodiment. Specifically, as a first solution, a solution in which SDS was dissolved using water as a solvent and a surfactant was prepared. A concentration of SDS in the first solution was set to 3%. Then, an amorphous carbon raw material and a silicon raw material were added to the first solution so that a mass ratio of SDS in the first solution to the amorphous carbon raw material to be added was 3%, and the mixture was stirred with a stirring propeller (360 rpm) to obtain a second solution. The amount of silicon added was 4 wt % with respect to the amount of carbon added. Then, ammonium tungstate (tungsten solution) was added to the second solution so that the amount of W contained in the ammonium tungstate (tungsten solution) with respect to the amorphous carbon raw material in the second solution was 5% in terms of a mass ratio, thereby obtaining a third solution. Then, the third solution was stirred with a stirring propeller (180 rpm), and then moisture was evaporated by heating and dried to produce a negative electrode intermediate. Then, the negative electrode intermediate was introduced into a tubular furnace (firing furnace), and heated to 550° C. (first heating temperature) at a first heating rate of 60° C./hour under an argon atmosphere. After reaching the first heating temperature, the temperature was raised to 700° C. (second heating temperature) at a second heating temperature of 180° C./hour and held for 2 hours. After holding for 2 hours, the heating was stopped and the temperature was naturally lowered to 50° C. to produce a negative electrode material.

Example 2

In Example 2, a negative electrode material was produced in the same manner as in Example 1, except that the pulverization time was set to 3 hours, and the amounts of silicon, tungsten, and SDS added were set to 5 wt %, 5 wt %, and 3 wt %, respectively.

Example 3

In Example 3, a negative electrode material was produced in the same manner as in Example 1, except that the pulverization time was set to 4 hours, and the amounts of silicon, tungsten, and SDS added were set to 5 wt %, 5 wt %, and 3 wt %, respectively.

Example 4

In Example 4, a negative electrode material was produced in the same manner as in Example 1, except that the shape of the container used for pulverization was an 80 mmΦ SUS long body container, the pulverization time was set to 2 hours, and the amounts of silicon, tungsten, and SDS added were set to 5 wt %, 5 wt %, and 3 wt %, respectively.

Example 5

In Example 5, a negative electrode material was produced in the same manner as in Example 1, except that the shape of the container used for pulverization was an 80 mmΦ SUS long body container, the pulverization time was set to 1 hour, and the amounts of silicon, tungsten, and SDS added were set to 10 wt %, 5 wt %, and 3 wt %, respectively.

Example 6

In Example 6, a negative electrode material was produced in the same manner as in Example 1, except that the shape of the container used for pulverization was an 80 mmΦ SUS long body container, the pulverization time was set to 3 hours, and the amounts of silicon, tungsten, and SDS added were set to 10 wt %, 5 wt %, and 3 wt %, respectively.

Example 7

In Example 7, a negative electrode material was produced in the same manner as in Example 1, except the pulverization time was set to 2 hours, the concentration of $C_{12}H_{25}O(C_2H_4)_nH$ (poly(oxyethylene) dodecyl ether) as a surfactant in the first solution was set to 4%, and the concentration of sodium stearate was set to 1%.

Comparative Example 1

In Comparative Example 1, only amorphous carbon was used as a negative electrode material.

Comparative Example 2

In Comparative Example 2, a negative electrode material was produced in the same manner as in Example 1, except that the shape of the container used for pulverization was an 80 mmΦ SUS long body container, the atmosphere inside the container was air, the pulverization time was set to 1 hour, and the amounts of silicon, tungsten, and SDS added were set to 10 wt %, 4 wt %, and 2 wt %, respectively.

Comparative Example 3

In Comparative Example 3, a negative electrode material was produced in the same manner as in Example 1, except that the shape of the container used for pulverization was an 80 mmΦ $ZrO_2$ spherical container, the atmosphere inside the container was air, the pulverization time was set to 3 hours, and the amounts of silicon, tungsten, and SDS added were set to 10 wt %, 8 wt %, and 2 wt %, respectively.

Characteristics of Silicon Material

FIG. 10 is a table showing production conditions and characteristics of a silicon material in each example. As illustrated in FIG. 10, for the silicon material of each example, characteristics based on XPS measurement were measured. The concentration of Si in FIG. 10 corresponds to the concentration of Si described in the present embodiment, the concentration of O in FIG. 10 corresponds to the concentration of O described in the present embodiment, the concentration proportion of Si derived from $SiO_2$ in FIG. 10 corresponds to the concentration proportion of Si derived from $SiO_2$ described in the present embodiment, the concentration proportion of Si derived from Si in FIG. 10 corresponds to the concentration proportion of Si derived from Si described in the present embodiment, the concentration proportion ratio Si/Si ($SiO_2$) in FIG. 10 corresponds to the ratio of the amount of Si in Si2p derived from elemental silicon to the amount of Si in Si2p derived from $SiO_2$ in the surface layer described in the present embodiment, the concentration ratio Si/O in FIG. 10 corresponds to the ratio of the amount of Si in Si2p to the amount of O in O1s in the surface layer described in the present embodiment, and the oxide film thickness in FIG. 10 corresponds to the thickness of the oxide layer 33B described in the present embodiment. In the X-ray photoelectron spectroscopy in each example, the apparatus and conditions described in the present embodiment were used.

In addition, as illustrated in FIG. 10, for the silicon material of each example, the volume average particle size and characteristics based on D50 measurement were measured. A silicon material was put into an aqueous surfactant solution, and silicon fine particles were dispersed by ultrasonic treatment to prepare a silicon fine particle dispersion. Next, the particle size distribution of the silicon fine particles in the obtained silicon fine particle dispersion was measured using a laser diffraction/scattering type particle size distribution measuring apparatus (MT3300EX II, manufactured by MicrotracBEL Corporation). From the obtained particle size distribution, the volume average particle size and D50 were determined. The $SiO_2$ volume in FIG. 10 corresponds to the volume of the oxide layer 33B calculated using the volume average particle size (or D50) in the present embodiment, the particle volume in FIG. 10 corresponds to the volume of the silicon particles 33 calculated using the volume average particle size (or D50) in the present embodiment, and the $SiO_2$ volume/particle volume in FIG. 10 corresponds to the volume ratio of the oxide layer 33B based on the volume average particle size (or D50) in the present embodiment.

Identification of Negative Electrode Material

FIG. 11 is a table showing identification results of the negative electrode material in each example. The negative electrode material produced in each example was subjected to fluorescent X-ray analysis to measure the content of elements contained in the negative electrode material and Na/W, Si/C, W/C, Si/W, and Si/O. The measurement results of the contents of the elements are illustrated in FIG. 11. Note that as the measurement conditions of the fluorescent X-ray analysis, the conditions described in the above embodiment were used.

The negative electrode materials of Examples 1 to 7 also contain elements (here, S) other than C derived from amorphous carbon, Si derived from a silicon material, and Na, W, and O derived from sodium tungstate, but these elements are impurities. In addition, inevitable impurities may be included in addition to the elements listed in FIG. 11.

The negative electrode material produced in each example was subjected to XRD to identify the chemical formula and crystal structure of sodium tungstate included in the negative electrode material. The identification results are illustrated in FIG. 11. Note that as the measurement conditions of XRD, the conditions described in the above embodiment were used.

Evaluation Results

As the evaluation of the negative electrode material of each example, the capacity of the negative electrode using the negative electrode material was measured. Specifically, a current value per 1 g (mAh/g) when the C-rate was 0.2 and a current value per 1 g (mAh/g) when the C-rate was 3.2 were measured. For example, the current value of the negative electrode per 1 g when the C-rate is 0.2 refers to a current value that consumes a rated capacity in 5 hours.

In addition, as the evaluation of the negative electrode material of each example, whether lithium flowed into Si of the negative electrode or lithium was released from Si of the negative electrode was also confirmed. There was a case where lithium flowed into Si of the negative electrode, and there was no case where lithium did not flow into Si of the negative electrode.

FIG. 11 illustrates evaluation results. As illustrated in FIG. 11, it is found that in Examples 1 to 7 in which $Si/Si(SiO_2)$ is 3 or more and sodium tungstate is provided on the surface of the carbon, the battery characteristics at 0.2 C are improved as compared with Comparative Example 1 in which sodium tungstate is not included. Further, it can be seen that the battery characteristics at 3.2 C of Examples 1 to 7 also maintain sufficient values.

Although the embodiments of the present invention have been described above, the embodiments are not limited by the contents of the embodiments. In addition, the constituent elements described above include those that can be easily assumed by those skilled in the art or those that are substantially the same. Furthermore, the constituent elements described above can be appropriately combined. Furthermore, various omissions, substitutions, or changes in the constituent elements can be made without departing from the gist of the embodiments described above.

REFERENCE SIGNS LIST

1 Battery
14 Negative electrode
22 Negative electrode material layer
30 Carbon particle
32 $Na_xWO_y$ particle
33 Silicon particle

The invention claimed is:

1. A negative electrode material for a battery, comprising:
carbon, sodium tungstate, and a silicon material including silicon,
wherein, in the silicon material, a ratio of an amount of Si in Si2p derived from elemental silicon to an amount of Si in Si2p derived from $SiO_2$ in a surface layer is 3 or more, on an atomic concentration basis, as measured by X-ray photoelectron spectroscopy.

2. The negative electrode material according to claim 1, wherein, in the silicon material, a ratio of an amount of Si in Si2p to an amount of O in O1s in the surface layer is 1.2 or more, on an atomic concentration basis, as measured by X-ray photoelectron spectroscopy.

3. The negative electrode material according to claim 1, wherein the silicon material includes a Si layer including Si and an oxide layer formed over a surface of the Si layer and including a silicon oxide, and when a volume of the silicon material is calculated using a volume average particle size, assuming that the silicon material is spherical, a volume of the oxide layer to a total volume of the silicon material is 0.04% or less.

4. The negative electrode material according to claim 1, wherein the silicon material includes a Si layer including Si and an oxide layer formed over a surface of the Si layer and including Si and O, and when a volume of the silicon material is calculated using a particle size D50 at a cumulative frequency of 50 vol % in a volume-based particle size distribution measured by a laser diffraction scattering method, assuming that the silicon material is spherical, a volume of the oxide layer to a total volume of the silicon material is 0.4% or less.

5. The negative electrode material according to claim 1, wherein the sodium tungstate is represented by a chemical formula of $Na_xWO_y$, x is more than 0 and 1 or less, and y is 2 or more and 4 or less.

6. The negative electrode material according to claim 1, wherein a content of sodium is 0.01% or more and 0.5% or less in terms of a mass ratio, a content of tungsten is 0.5% or more and 20% or less in terms of a mass ratio, and a content of oxygen is 1% or more and 15% or less in terms of a mass ratio, as measured by fluorescent X-ray analysis.

7. The negative electrode material according to claim 1, wherein Na/W that is a content ratio of sodium to tungsten is 0.001 or more and 0.2 or less, as measured by fluorescent X-ray analysis.

8. The negative electrode material according to claim 1, wherein the negative electrode material includes at least one of $Na_{0.78}WO_3$, $Na_{0.48}WO_3$, $Na_{0.72}WO_3$, $Na_{0.44}WO_3$, $Na_{0.49}WO_3$, $Na_{0.33}WO_3$, $Na_{0.58}WO_3$, $Na_2WO_4$, and $Na_5W_{14}O_{44}$ as the sodium tungstate.

9. A battery comprising:

the negative electrode material according to claim 1; and a positive electrode material.

10. A method for producing a negative electrode material for a battery, the method comprising:

preparing a silicon raw material under an atmosphere having an oxygen concentration of 5% or less; and producing the negative electrode material including carbon, sodium tungstate, and a silicon material by using the silicon raw material, wherein, in the silicon material, a ratio of an amount of Si in Si2p derived from elemental silicon to an amount of Si in Si2p derived from $SiO_2$ in a surface layer is 3 or more, on an atomic concentration basis, as measured by X-ray photoelectron spectroscopy.

11. A method for producing a battery, the method comprising:

the method for producing a negative electrode material according to claim 10; and producing a positive electrode material.

* * * * *